(12) United States Patent
Levola et al.

(10) Patent No.: US 10,018,844 B2
(45) Date of Patent: Jul. 10, 2018

(54) WEARABLE IMAGE DISPLAY SYSTEM

(71) Applicant: Microsoft Technology Licensing, LLC, Redmond, WA (US)

(72) Inventors: Tapani Levola, Espoo (FI); Pasi Saarikko, Espoo (FI); Steven John Robbins, Bellevue, WA (US); Yarn Chee Poon, Redmond, WA (US); Lena Adele Wolfe, Seattle, WA (US); Erica Lee Towle, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 14/617,769

(22) Filed: Feb. 9, 2015

(65) Prior Publication Data

US 2016/0231570 A1   Aug. 11, 2016

(51) Int. Cl.
*G02B 5/18*   (2006.01)
*G02B 27/01*   (2006.01)
(Continued)

(52) U.S. Cl.
CPC ......... *G02B 27/0172* (2013.01); *G02B 6/005* (2013.01); *G02B 6/0016* (2013.01);
(Continued)

(58) Field of Classification Search
CPC ... G02B 5/18; G02B 5/20; G02B 5/22; G02B 5/23; G02B 5/24; G02B 5/26; G02B 5/28;
(Continued)

(56) References Cited

U.S. PATENT DOCUMENTS 3,227,888 A   1/1966   Turnbull et al.
3,410,774 A   11/1968   Barson et al.
(Continued)

FOREIGN PATENT DOCUMENTS

AU   2011204946   12/2011
CN   1440513   9/2003
(Continued)

OTHER PUBLICATIONS

US 9,632,316, 04/2017, Levola (withdrawn)
(Continued)

*Primary Examiner* — Bumsuk Won
*Assistant Examiner* — Tamara Y Washington
(74) *Attorney, Agent, or Firm* — Rainier Patents, P.S.

(57) ABSTRACT

A wearable image display system includes a headpiece, a first and a second light engine, and a first and a second optical component. The first and second light engines generate a first and a second set of beams respectively, each beam substantially collimated so that the first and second set form a first and a second virtual image respectively. Each optical component is located to project an image onto a first and a second eye of a wearer respectively. The first and second sets of beams are directed to incoupling structures of the first and second optical components respectively. Exit structures of the first and second optical components guide the first and second sets of beams onto the first and second eyes respectively. The optical components are located between the light engines and the eyes. Both of the light engines are mounted to a central portion of the headpiece.

18 Claims, 14 Drawing Sheets

(51) Int. Cl.
  *G06T 19/00* (2011.01)
  *F21V 8/00* (2006.01)
  *G02B 27/00* (2006.01)
  *G02B 27/42* (2006.01)

(52) U.S. Cl.
  CPC ....... *G02B 6/0035* (2013.01); *G02B 27/0018* (2013.01); *G02B 27/0081* (2013.01); *G02B 27/4272* (2013.01); *G06T 19/006* (2013.01); *G02B 27/0176* (2013.01); *G02B 2027/011* (2013.01); *G02B 2027/0123* (2013.01); *G02B 2027/0134* (2013.01); *G02B 2027/0152* (2013.01); *G02B 2027/0161* (2013.01); *G02B 2027/0178* (2013.01)

(58) Field of Classification Search
  CPC . G02B 5/30; G02B 5/32; G02B 6/124; G02B 6/125; G02B 6/34; G02B 27/28; G02B 27/0123; G02B 27/10; G02B 27/44; G02B 27/60; G02B 27/01; G02B 27/0101; G02B 27/0105; G02B 27/0125; G02B 27/017; G02B 27/0172; G02B 27/42
  USPC ....... 359/1, 13, 14, 15, 19, 32, 34, 558–576, 359/629–634, 204.5, 207.7, 211.6, 359/337.21, 256, 538, 618; 345/6–9, 345/632–633; 715/757
  See application file for complete search history.

(56) References Cited

U.S. PATENT DOCUMENTS

| | | |
|---|---|---|
| 3,542,453 A | 11/1970 | Kantor |
| 3,836,258 A | 9/1974 | Courten et al. |
| 3,906,528 A | 9/1975 | Johnson |
| 3,971,065 A | 7/1976 | Bayer |
| 4,200,395 A | 4/1980 | Stewart et al. |
| 4,294,507 A | 10/1981 | Johnson |
| 4,343,890 A | 8/1982 | Phillips et al. |
| 4,402,610 A | 9/1983 | Lacombat |
| 4,560,249 A | 12/1985 | Nishiwaki et al. |
| 4,664,524 A | 5/1987 | Hattori et al. |
| 4,711,512 A | 12/1987 | Upatnieks |
| 4,758,087 A | 7/1988 | Hicks, Jr. |
| 4,799,752 A | 1/1989 | Carome |
| 4,822,145 A | 4/1989 | Staelin |
| 4,860,361 A | 8/1989 | Sato et al. |
| 4,900,129 A | 2/1990 | Vanderwerf |
| 4,957,351 A | 9/1990 | Shioji |
| 5,004,673 A | 4/1991 | Vlannes |
| 5,019,808 A | 5/1991 | Prince et al. |
| 5,019,898 A | 5/1991 | Chao et al. |
| 5,106,181 A | 4/1992 | Rockwell, III |
| 5,114,236 A | 5/1992 | Matsugu et al. |
| 5,146,355 A | 9/1992 | Prince et al. |
| 5,162,656 A | 11/1992 | Matsugu et al. |
| 5,216,257 A | 6/1993 | Brueck et al. |
| 5,252,950 A | 10/1993 | Saunders et al. |
| 5,305,389 A | 4/1994 | Palmer |
| 5,309,169 A | 5/1994 | Lippert |
| 5,313,535 A | 5/1994 | Williams |
| 5,359,444 A | 10/1994 | Piosenka et al. |
| 5,413,884 A | 5/1995 | Koch et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,549,212 A | 8/1996 | Kanoh et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,630,902 A | 5/1997 | Galarneau et al. |
| 5,648,643 A | 7/1997 | Knowles et al. |
| 5,651,414 A | 7/1997 | Suzuki et al. |
| 5,673,146 A | 9/1997 | Kelly |
| 5,705,321 A | 1/1998 | Brueck et al. |
| 5,708,449 A | 1/1998 | Heacock et al. |
| 5,708,736 A | 1/1998 | Steinblatt |
| 5,712,995 A | 1/1998 | Cohn |
| 5,714,967 A | 2/1998 | Okamura et al. |
| 5,737,171 A | 4/1998 | Buller et al. |
| 5,751,476 A | 5/1998 | Matsui et al. |
| 5,771,042 A | 6/1998 | Santos-Gomez |
| 5,771,320 A | 6/1998 | Stone |
| 5,772,903 A | 6/1998 | Hirsch |
| 5,777,715 A | 7/1998 | Kruegle et al. |
| 5,856,842 A | 1/1999 | Tedesco |
| 5,861,931 A | 1/1999 | Gillian et al. |
| 5,880,725 A | 3/1999 | Southgate |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,169,829 B1 | 1/2001 | Laming et al. |
| 6,181,852 B1 | 1/2001 | Adams et al. |
| 6,188,427 B1 | 2/2001 | Anderson et al. |
| 6,200,711 B1 | 3/2001 | Kurihara et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,949 B1 | 11/2001 | Lading et al. |
| 6,323,970 B1 | 11/2001 | Popovich |
| 6,377,401 B1 | 4/2002 | Bartlett |
| 6,385,641 B1 | 5/2002 | Jiang |
| 6,411,512 B1 | 6/2002 | Mankaruse et al. |
| 6,417,892 B1 | 7/2002 | Sharp et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,483,580 B1 | 11/2002 | Xu et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,553,165 B1 | 4/2003 | Temkin et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,661,436 B2 | 12/2003 | Barksdale et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,792,328 B2 | 9/2004 | Laughery et al. |
| 6,804,115 B2 | 10/2004 | Lai |
| 6,809,925 B2 | 10/2004 | Belady et al. |
| 6,819,426 B2 | 11/2004 | Sezginer et al. |
| 6,825,987 B2 | 11/2004 | Repetto et al. |
| 6,829,093 B1 | 12/2004 | Nakai |
| 6,829,095 B2 | 12/2004 | Amitai |
| 6,867,753 B2 | 3/2005 | Chinthammit et al. |
| 6,877,134 B1 | 4/2005 | Fuller et al. |
| 6,888,613 B2 | 5/2005 | Robins et al. |

(56) References Cited

U.S. PATENT DOCUMENTS

| | | |
|---|---|---|
| 6,889,755 B2 | 5/2005 | Zuo et al. |
| 6,898,596 B2 | 5/2005 | Aikens et al. |
| 6,906,901 B1 | 6/2005 | Liu |
| 6,916,584 B2 | 7/2005 | Sreenivasan et al. |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,974,714 B2 | 12/2005 | Uno |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,020,848 B2 | 3/2006 | Rosenzweig et al. |
| 7,031,894 B2 | 4/2006 | Niu et al. |
| 7,048,385 B2 | 5/2006 | Beeson et al. |
| 7,061,624 B2 | 6/2006 | Ishizuka |
| 7,069,975 B1 | 7/2006 | Haws et al. |
| 7,072,049 B2 | 7/2006 | Niu et al. |
| 7,099,005 B1 | 8/2006 | Fabrikant et al. |
| 7,113,605 B2 | 9/2006 | Rui et al. |
| 7,116,555 B2 | 10/2006 | Kamath et al. |
| 7,151,635 B2 | 12/2006 | Bidnyk et al. |
| 7,159,174 B2 | 1/2007 | Johnson et al. |
| 7,181,699 B2 | 2/2007 | Morrow et al. |
| 7,184,615 B2 | 2/2007 | Levola |
| 7,189,362 B2 | 3/2007 | Nordin et al. |
| 7,191,820 B2 | 3/2007 | Chou et al. |
| 7,193,584 B2 | 3/2007 | Lee et al. |
| 7,196,758 B2 | 3/2007 | Crawford et al. |
| 7,206,107 B2 | 4/2007 | Levola |
| 7,212,709 B2 | 5/2007 | Hosoi |
| 7,212,723 B2 | 5/2007 | McLeod et al. |
| 7,250,930 B2 | 7/2007 | Hoffman et al. |
| 7,253,445 B2 | 8/2007 | Heremans et al. |
| 7,261,453 B2 | 8/2007 | Morejon et al. |
| 7,261,827 B2 | 8/2007 | Ootsu et al. |
| 7,271,795 B2 | 9/2007 | Bradski |
| 7,277,282 B2 | 10/2007 | Tate |
| 7,301,587 B2 | 11/2007 | Uehara et al. |
| 7,324,754 B2 | 1/2008 | Kobayashi et al. |
| 7,333,690 B1 | 2/2008 | Peale et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,372,565 B1 | 5/2008 | Holden et al. |
| 7,376,852 B2 | 5/2008 | Edwards |
| 7,396,133 B2 | 7/2008 | Burnett et al. |
| 7,399,420 B2 | 7/2008 | Paek et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,437,678 B2 | 10/2008 | Awada et al. |
| 7,455,102 B2 | 11/2008 | Cheng |
| 7,496,642 B2 | 2/2009 | Gill et al. |
| 7,505,269 B1 | 3/2009 | Cosley et al. |
| 7,513,627 B2 | 4/2009 | Larson et al. |
| 7,515,143 B2 | 4/2009 | Keam et al. |
| 7,515,279 B2 | 4/2009 | Raymond |
| 7,518,740 B2 | 4/2009 | Chard et al. |
| 7,532,227 B2 | 5/2009 | Nakajima et al. |
| 7,539,371 B2 | 5/2009 | Martinelli et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,587,419 B2 | 9/2009 | Thorpe et al. |
| 7,607,111 B2 | 10/2009 | Vaananen et al. |
| 7,612,882 B2 | 11/2009 | Wu et al. |
| 7,619,895 B1 | 11/2009 | Wertz et al. |
| 7,631,687 B2 | 12/2009 | Yang |
| 7,634,478 B2 | 12/2009 | Yang et al. |
| 7,646,606 B2 | 1/2010 | Rytka et al. |
| 7,646,950 B2 | 1/2010 | Park et al. |
| 7,649,594 B2 | 1/2010 | Kim et al. |
| 7,656,912 B2 | 2/2010 | Brueck et al. |
| 7,660,500 B2 | 2/2010 | Konttinen et al. |
| 7,668,842 B2 | 2/2010 | LaChapelle et al. |
| 7,679,641 B2 | 3/2010 | Lipton et al. |
| 7,693,292 B1 | 4/2010 | Gross et al. |
| 7,693,911 B2 | 4/2010 | Wories et al. |
| 7,701,716 B2 | 4/2010 | Blanco, Jr. et al. |
| 7,706,785 B2 | 4/2010 | Lei et al. |
| 7,716,003 B1 | 5/2010 | Wack et al. |
| 7,716,317 B2 | 5/2010 | Kumar et al. |
| 7,719,769 B2 | 5/2010 | Sugihara et al. |
| 7,728,933 B2 | 6/2010 | Kim et al. |
| 7,730,113 B1 | 6/2010 | Payette et al. |
| 7,764,413 B2 | 7/2010 | Levola |
| 7,768,534 B2 | 8/2010 | Pentenrieder et al. |
| 7,777,944 B2 | 8/2010 | Ho et al. |
| 7,783,669 B2 | 8/2010 | Qiu et al. |
| 7,788,474 B2 | 8/2010 | Switzer et al. |
| 7,817,104 B2 | 10/2010 | Ryu et al. |
| 7,826,508 B2 | 11/2010 | Reid et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,871,811 B2 | 1/2011 | Fang et al. |
| 7,882,115 B2 | 2/2011 | Hirsch |
| 7,890,882 B1 | 2/2011 | Nelson |
| 7,894,613 B1 | 2/2011 | Ong et al. |
| 7,903,409 B2 | 3/2011 | Patel et al. |
| 7,904,832 B2 | 3/2011 | Ubillos |
| 7,908,273 B2 | 3/2011 | DiMaria et al. |
| 7,909,958 B2 | 3/2011 | Washburn et al. |
| 7,941,231 B1 | 5/2011 | Dunn |
| 7,949,214 B2 | 5/2011 | DeJong |
| 7,966,184 B2 | 6/2011 | O'Conor et al. |
| 7,986,462 B2 | 7/2011 | Kobayashi et al. |
| 8,004,621 B2 | 8/2011 | Woodgate et al. |
| 8,014,644 B2 | 9/2011 | Morimoto et al. |
| 8,033,709 B2 | 10/2011 | Kao et al. |
| 8,035,896 B2 | 10/2011 | Taira et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,108,430 B2 | 1/2012 | Wong et al. |
| 8,125,579 B2 | 2/2012 | Khan et al. |
| 8,128,800 B2 | 3/2012 | Seo et al. |
| 8,139,504 B2 | 3/2012 | Mankins et al. |
| 8,150,893 B2 | 4/2012 | Bohannon et al. |
| 8,160,411 B2 | 4/2012 | Levola et al. |
| 8,162,524 B2 | 4/2012 | Van Ostrand et al. |
| 8,165,988 B2 | 4/2012 | Shau et al. |
| 8,176,436 B2 | 5/2012 | Arend et al. |
| 8,189,263 B1 | 5/2012 | Wang et al. |
| 8,195,220 B2 | 6/2012 | Kim et al. |
| 8,200,704 B2 | 6/2012 | Petakov et al. |
| 8,233,204 B1 | 7/2012 | Robbins et al. |
| 8,233,273 B2 | 7/2012 | Chen et al. |
| 8,244,667 B1 | 8/2012 | Weinberger et al. |
| 8,246,170 B2 | 8/2012 | Yamamoto et al. |
| 8,274,614 B2 | 9/2012 | Yokote et al. |
| 8,280,861 B1 | 10/2012 | Park et al. |
| 8,291,349 B1 | 10/2012 | Park et al. |
| 8,300,614 B2 | 10/2012 | Ankaiah et al. |
| 8,320,032 B2 | 11/2012 | Levola |
| 8,332,402 B2 | 12/2012 | Forstall et al. |
| 8,358,400 B2 | 1/2013 | Escuti |
| 8,384,999 B2 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,434,019 B2 | 4/2013 | Nelson |
| 8,446,340 B2 | 5/2013 | Aharoni |
| 8,466,953 B2 | 6/2013 | Levola |
| 8,472,119 B1 | 6/2013 | Kelly |

(56) References Cited

U.S. PATENT DOCUMENTS

| | | |
|---|---|---|
| 8,482,920 B2 | 7/2013 | Tissot et al. |
| 8,571,539 B1 | 10/2013 | Ranganathan et al. |
| 8,576,143 B1 | 11/2013 | Kelly |
| 8,589,341 B2 | 11/2013 | Golde et al. |
| 8,593,734 B2 | 11/2013 | Laakkonen |
| 8,594,702 B2 | 11/2013 | Naaman et al. |
| 8,605,700 B2 | 12/2013 | Gurin |
| 8,611,014 B2 | 12/2013 | Valera et al. |
| 8,627,228 B2 | 1/2014 | Yosef et al. |
| 8,629,815 B2 | 1/2014 | Brin et al. |
| 8,634,139 B1 | 1/2014 | Brown et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,693,500 B2 | 4/2014 | Ludwig et al. |
| 8,698,845 B2 | 4/2014 | Lemay |
| 8,700,931 B2 | 4/2014 | Gudlavenkatasiva et al. |
| 8,712,598 B2 | 4/2014 | Dighde et al. |
| 8,717,676 B2 | 5/2014 | Rinko |
| 8,745,513 B2 | 6/2014 | Crystal |
| 8,754,831 B2 | 6/2014 | Kollin et al. |
| 8,770,813 B2 | 7/2014 | Bohn et al. |
| 8,793,282 B2 | 7/2014 | Hedinsson et al. |
| 8,796,012 B2 | 8/2014 | Sinclair et al. |
| 8,810,600 B2 | 8/2014 | Bohn et al. |
| 8,817,350 B1 | 8/2014 | Robbins et al. |
| 8,819,079 B2 | 8/2014 | Bush et al. |
| 8,823,531 B1 | 9/2014 | McCleary et al. |
| 8,843,744 B2 | 9/2014 | Sentinelli et al. |
| 8,854,802 B2 | 10/2014 | Robinson et al. |
| 8,885,997 B2 | 11/2014 | Nguyen et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 8,990,255 B2 | 3/2015 | Metsatahti et al. |
| 9,003,162 B2 | 4/2015 | Lomet et al. |
| 9,052,414 B2 | 6/2015 | Travis et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,304,235 B2 | 4/2016 | Sainiemi et al. |
| 9,368,546 B2 | 6/2016 | Fleck et al. |
| 9,372,347 B1 | 6/2016 | Levola et al. |
| 9,423,360 B1 | 8/2016 | Kostamo et al. |
| 9,429,692 B1 | 8/2016 | Saarikko et al. |
| 9,513,480 B2 | 12/2016 | Saarikko et al. |
| 9,514,211 B2 | 12/2016 | Sengupta et al. |
| 9,535,253 B2 | 1/2017 | Levola et al. |
| 9,558,590 B2 | 1/2017 | Westerinen et al. |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 9,779,643 B2 | 10/2017 | Bohn et al. |
| 9,807,381 B2 | 10/2017 | Flek et al. |
| 9,827,209 B2 | 11/2017 | Kostamo |
| 2001/0043208 A1 | 11/2001 | Furness, III et al. |
| 2002/0015110 A1 | 2/2002 | Brown Elliott |
| 2002/0035455 A1 | 3/2002 | Niu et al. |
| 2002/0038196 A1 | 3/2002 | Johnson et al. |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0138772 A1 | 9/2002 | Crawford et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2003/0204698 A1 | 10/2003 | Sachedina et al. |
| 2003/0214728 A1 | 11/2003 | Olczak |
| 2004/0011503 A1 | 1/2004 | Kung et al. |
| 2004/0012341 A1 | 1/2004 | Hyuga |
| 2004/0024580 A1 | 2/2004 | Salmonsen et al. |
| 2004/0042724 A1 | 3/2004 | Gombert et al. |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0139169 A1 | 7/2004 | O'Brien et al. |
| 2004/0151466 A1 | 8/2004 | Crossman-Bosworth et al. |
| 2004/0176928 A1 | 9/2004 | Johnson |
| 2004/0195963 A1 | 10/2004 | Choi et al. |
| 2004/0267990 A1 | 12/2004 | Lin |
| 2005/0089328 A1 | 4/2005 | Nishiki et al. |
| 2005/0100272 A1 | 5/2005 | Gilman |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0246352 A1 | 11/2005 | Moore et al. |
| 2005/0248705 A1 | 11/2005 | Smith et al. |
| 2005/0285878 A1 | 12/2005 | Singh et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0080401 A1 | 4/2006 | Gill et al. |
| 2006/0118280 A1 | 6/2006 | Liu |
| 2006/0126181 A1 | 6/2006 | Levola |
| 2006/0129951 A1 | 6/2006 | Vaananen et al. |
| 2006/0132806 A1 | 6/2006 | Shchegrov et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0155723 A1 | 7/2006 | Kumar et al. |
| 2006/0164382 A1 | 7/2006 | Kulas et al. |
| 2006/0183331 A1 | 8/2006 | Hofmann |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2006/0250541 A1 | 11/2006 | Huck |
| 2007/0002412 A1 | 1/2007 | Aihara |
| 2007/0005334 A1 | 1/2007 | Salmonsen |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0171328 A1 | 7/2007 | Freeman et al. |
| 2007/0177260 A1 | 8/2007 | Kuppenheimer et al. |
| 2007/0208687 A1 | 9/2007 | O'Conor et al. |
| 2007/0214180 A1 | 9/2007 | Crawford |
| 2007/0236959 A1 | 10/2007 | Tolbert |
| 2007/0284093 A1 | 12/2007 | Bhatti et al. |
| 2007/0288478 A1 | 12/2007 | DiMaria et al. |
| 2008/0005348 A1 | 1/2008 | Kosiba et al. |
| 2008/0007511 A1 | 1/2008 | Tsuboi et al. |
| 2008/0008076 A1 | 1/2008 | Raguin et al. |
| 2008/0014534 A1 | 1/2008 | Barwicz et al. |
| 2008/0025350 A1 | 1/2008 | Arbore et al. |
| 2008/0043100 A1 | 2/2008 | Sobel et al. |
| 2008/0043425 A1 | 2/2008 | Hebert et al. |
| 2008/0059535 A1 | 3/2008 | Lindsley et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |

(56) References Cited

U.S. PATENT DOCUMENTS

| | | |
|---|---|---|
| 2008/0174735 A1 | 7/2008 | Quach et al. |
| 2008/0189303 A1 | 8/2008 | Bush et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0059376 A1 | 3/2009 | Hayakawa |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0113301 A1 | 4/2009 | Fisher et al. |
| 2009/0128449 A1 | 5/2009 | Brown et al. |
| 2009/0128901 A1 | 5/2009 | Tilleman et al. |
| 2009/0144642 A1 | 6/2009 | Crystal |
| 2009/0180250 A1 | 7/2009 | Holling et al. |
| 2009/0188610 A1 | 7/2009 | Yamamoto |
| 2009/0189974 A1 | 7/2009 | Deering |
| 2009/0190003 A1 | 7/2009 | Park et al. |
| 2009/0193024 A1 | 7/2009 | Dhananjaya |
| 2009/0195756 A1 | 8/2009 | Li et al. |
| 2009/0199128 A1 | 8/2009 | Matthews et al. |
| 2009/0222147 A1 | 9/2009 | Nakashima et al. |
| 2009/0224416 A1 | 9/2009 | Laakkonen et al. |
| 2009/0235203 A1 | 9/2009 | Iizuka |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2009/0303599 A1 | 12/2009 | Levola |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0074291 A1 | 3/2010 | Nakamura |
| 2010/0079865 A1 | 4/2010 | Saarikko et al. |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Sesselberg et al. |
| 2010/0138809 A1 | 6/2010 | Shenfield et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0191783 A1 | 7/2010 | Mason |
| 2010/0200736 A1 | 8/2010 | Laycock et al. |
| 2010/0201953 A1 | 8/2010 | Freeman et al. |
| 2010/0202725 A1 | 8/2010 | Popovich et al. |
| 2010/0205178 A1 | 8/2010 | Bush et al. |
| 2010/0211575 A1 | 8/2010 | Collins et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Theodorus et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0277803 A1 | 11/2010 | Pockett et al. |
| 2010/0278484 A1 | 11/2010 | Scheerlinck et al. |
| 2010/0281382 A1 | 11/2010 | Meaney et al. |
| 2010/0281439 A1 | 11/2010 | Markovic et al. |
| 2010/0284085 A1 | 11/2010 | Laakkonen |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0321781 A1 | 12/2010 | Levola |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0026128 A1 | 2/2011 | Baker et al. |
| 2011/0032482 A1 | 2/2011 | Agurok |
| 2011/0038049 A1 | 2/2011 | Vallius et al. |
| 2011/0050547 A1 | 3/2011 | Mukawa |
| 2011/0050655 A1 | 3/2011 | Mukawa |
| 2011/0055765 A1 | 3/2011 | Neubrand et al. |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0096401 A1 | 4/2011 | Levola |
| 2011/0099512 A1 | 4/2011 | Jeong |
| 2011/0114823 A1 | 5/2011 | Katzir et al. |
| 2011/0115340 A1 | 5/2011 | Lee |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0149201 A1 | 6/2011 | Powell et al. |
| 2011/0163986 A1 | 7/2011 | Lee et al. |
| 2011/0175930 A1 | 7/2011 | Hwang et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0231192 A1 | 9/2011 | O'Conor et al. |
| 2011/0233431 A1 | 9/2011 | Wan et al. |
| 2011/0235179 A1 | 9/2011 | Simmonds |
| 2011/0242145 A1 | 10/2011 | Nishimura et al. |
| 2011/0242392 A1 | 10/2011 | Chiang |
| 2011/0242670 A1 | 10/2011 | Simmonds |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0295913 A1 | 12/2011 | Enbutsu |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0030616 A1 | 2/2012 | Howes et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0044573 A1 | 2/2012 | Simmonds et al. |
| 2012/0050144 A1 | 3/2012 | Morlock |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0084710 A1 | 4/2012 | Sirpal et al. |
| 2012/0102438 A1 | 4/2012 | Robinson et al. |
| 2012/0105487 A1 | 5/2012 | Son et al. |
| 2012/0106170 A1 | 5/2012 | Matthews et al. |

(56) References Cited

U.S. PATENT DOCUMENTS

| | | |
|---|---|---|
| 2012/0111544 A1 | 5/2012 | Senatori |
| 2012/0113092 A1 | 5/2012 | Bar-Zeev et al. |
| 2012/0120493 A1 | 5/2012 | Simmonds et al. |
| 2012/0127577 A1 | 5/2012 | Desserouer |
| 2012/0134623 A1 | 5/2012 | Boudreau et al. |
| 2012/0144331 A1 | 6/2012 | Tolonen et al. |
| 2012/0157114 A1 | 6/2012 | Alameh et al. |
| 2012/0162764 A1 | 6/2012 | Shimizu |
| 2012/0176322 A1 | 7/2012 | Karmi et al. |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0195553 A1 | 8/2012 | Hasegawa et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0262657 A1 | 10/2012 | Nakanishi et al. |
| 2012/0287381 A1 | 11/2012 | Li et al. |
| 2012/0292535 A1 | 11/2012 | Choi et al. |
| 2012/0296191 A1 | 11/2012 | McGrath et al. |
| 2012/0304092 A1 | 11/2012 | Jarrett et al. |
| 2012/0311481 A1 | 12/2012 | Reyna |
| 2013/0000871 A1 | 1/2013 | Olson et al. |
| 2013/0019273 A1 | 1/2013 | Ma et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106592 A1 | 5/2013 | Morgan et al. |
| 2013/0106674 A1 | 5/2013 | Wheeler et al. |
| 2013/0148864 A1 | 6/2013 | Dolson et al. |
| 2013/0155070 A1 | 6/2013 | Luo |
| 2013/0158957 A1 | 6/2013 | Lee et al. |
| 2013/0162673 A1 | 6/2013 | Bohn |
| 2013/0163089 A1 | 6/2013 | Bohn |
| 2013/0170031 A1 | 7/2013 | Bohn |
| 2013/0170802 A1 | 7/2013 | Pitwon |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0198176 A1 | 8/2013 | Kim |
| 2013/0201285 A1 | 8/2013 | Mao et al. |
| 2013/0207896 A1 | 8/2013 | Robinson et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0226931 A1 | 8/2013 | Hazel et al. |
| 2013/0242056 A1 | 9/2013 | Fleck |
| 2013/0242555 A1 | 9/2013 | Mukawa |
| 2013/0250431 A1 | 9/2013 | Robbins et al. |
| 2013/0252628 A1 | 9/2013 | Kuehnel |
| 2013/0254412 A1 | 9/2013 | Menezes et al. |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0305184 A1 | 11/2013 | Kim et al. |
| 2013/0307875 A1 | 11/2013 | Anderson |
| 2013/0314789 A1 | 11/2013 | Saarikko et al. |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0339446 A1 | 12/2013 | Balassanian et al. |
| 2013/0342674 A1 | 12/2013 | Dixon |
| 2013/0346725 A1 | 12/2013 | Lomet et al. |
| 2014/0010265 A1 | 1/2014 | Peng |
| 2014/0022265 A1 | 1/2014 | Canan |
| 2014/0041827 A1 | 2/2014 | Giaimo |
| 2014/0059139 A1 | 2/2014 | Filev et al. |
| 2014/0063367 A1 | 3/2014 | Yang et al. |
| 2014/0078130 A1 | 3/2014 | Uchino et al. |
| 2014/0089833 A1 | 3/2014 | Hwang et al. |
| 2014/0094973 A1 | 4/2014 | Giaimo et al. |
| 2014/0098671 A1 | 4/2014 | Raleigh et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0116982 A1 | 5/2014 | Schellenberg et al. |
| 2014/0140653 A1 | 5/2014 | Brown et al. |
| 2014/0140654 A1 | 5/2014 | Brown et al. |
| 2014/0143247 A1 | 5/2014 | Rathnavelu et al. |
| 2014/0143351 A1 | 5/2014 | Deng |
| 2014/0143439 A1 | 5/2014 | Ramamurthy |
| 2014/0176528 A1 | 6/2014 | Robbins |
| 2014/0184699 A1 | 7/2014 | Ito et al. |
| 2014/0189557 A1 | 7/2014 | O'Connell et al. |
| 2014/0204455 A1 | 7/2014 | Popovich |
| 2014/0240842 A1 | 8/2014 | Nguyen et al. |
| 2014/0300966 A1 | 10/2014 | Travers et al. |
| 2014/0314374 A1 | 10/2014 | Fattal et al. |
| 2014/0320399 A1* | 10/2014 | Kim ............... G02B 27/0172 345/156 |
| 2015/0046500 A1 | 2/2015 | Bush et al. |
| 2015/0086163 A1 | 3/2015 | Valera et al. |
| 2015/0168731 A1 | 6/2015 | Robbins |
| 2015/0227231 A1 | 8/2015 | Chen |
| 2016/0033697 A1 | 2/2016 | Sainiemi et al. |
| 2016/0033784 A1 | 2/2016 | Levola et al. |
| 2016/0035539 A1 | 2/2016 | Sainiemi et al. |
| 2016/0110403 A1 | 4/2016 | Lomet et al. |
| 2016/0231257 A1 | 8/2016 | Kostamo et al. |
| 2016/0231477 A1 | 8/2016 | Saarikko et al. |
| 2016/0231478 A1 | 8/2016 | Kostamo |
| 2016/0231566 A1 | 8/2016 | Levola et al. |
| 2016/0231567 A1 | 8/2016 | Saarikko |
| 2016/0231568 A1 | 8/2016 | Sariko et al. |
| 2016/0231569 A1 | 8/2016 | Levola |
| 2016/0234485 A1 | 8/2016 | Robbins et al. |
| 2016/0282625 A1 | 9/2016 | Fleck et al. |
| 2016/0283618 A1 | 9/2016 | Levola et al. |
| 2017/0163977 A1 | 6/2017 | Fleck et al. |
| 2017/0235219 A1 | 8/2017 | Kostamo |
| 2017/0301270 A1 | 10/2017 | Bohn et al. |
| 2017/0326446 A1 | 11/2017 | Robbins et al. |

FOREIGN PATENT DOCUMENTS

| | | |
|---|---|---|
| CN | 101029968 | 9/2007 |
| CN | 101105512 | 1/2008 |
| CN | 101589326 | 11/2009 |
| CN | 201491069 | 5/2010 |
| CN | 101881936 | 11/2010 |
| CN | 102004315 | 4/2011 |
| CN | 102156555 | 8/2011 |
| DE | 102007021036 | 11/2008 |
| EP | 0959378 | 11/1999 |
| EP | 0977022 | 2/2000 |
| EP | 1494109 | 1/2005 |
| EP | 1847924 | 10/2007 |
| EP | 2065750 | 6/2009 |
| EP | 2083310 | 7/2009 |
| EP | 2112547 | 10/2009 |
| EP | 2144177 | 1/2010 |
| EP | 2216678 | 1/2010 |
| EP | 2196843 | 6/2010 |
| EP | 2241926 | 10/2010 |
| EP | 2662761 | 11/2013 |
| EP | 2700987 | 2/2014 |
| EP | 2752691 | 7/2014 |
| EP | 2887121 | 6/2015 |
| EP | 3018524 | 5/2016 |
| FR | 2942811 | 9/2010 |
| GB | 2500631 | 10/2013 |

(56) References Cited

FOREIGN PATENT DOCUMENTS

| | | |
|---|---|---|
| JP | S5557807 | 4/1980 |
| JP | S57109618 | 7/1982 |
| JP | S599920 | 1/1984 |
| JP | S5962888 | 4/1984 |
| JP | S60188911 | 9/1985 |
| JP | S6252506 | 3/1987 |
| JP | S62278508 | 12/1987 |
| JP | H02227340 | 9/1990 |
| JP | H03180801 | 8/1991 |
| JP | H0422358 | 1/1992 |
| JP | H06310806 | 11/1994 |
| JP | 7311303 | 11/1995 |
| JP | H08163602 | 6/1996 |
| JP | H08190640 | 7/1996 |
| JP | 2000013818 | 1/2000 |
| JP | 2000276613 | 10/2000 |
| JP | 2000347037 | 12/2000 |
| JP | 2001078234 | 3/2001 |
| JP | 2002365589 | 12/2002 |
| JP | 2003005128 | 1/2003 |
| JP | 2004219664 | 8/2004 |
| JP | 2005309638 | 11/2005 |
| JP | 2006195333 | 7/2006 |
| JP | 2006267887 | 10/2006 |
| JP | 2006349921 | 12/2006 |
| JP | 2008015125 | 1/2008 |
| JP | 2008017135 | 1/2008 |
| JP | 2008097599 | 4/2008 |
| JP | 2008518368 | 5/2008 |
| JP | 201061545 | 3/2010 |
| JP | 2012042654 | 3/2012 |
| KR | 20070001771 | 1/2007 |
| KR | 20090076539 | 7/2009 |
| KR | 20090084316 | 8/2009 |
| KR | 20110070087 | 6/2011 |
| KR | 20120023458 | 3/2012 |
| TW | 200846700 | 12/2008 |
| TW | 201407202 | 2/2014 |
| WO | WO-9418595 | 8/1994 |
| WO | WO-9952002 | 10/1999 |
| WO | WO-2001033282 | 5/2001 |
| WO | WO-0177915 | 10/2001 |
| WO | WO-0195027 | 12/2001 |
| WO | WO-03090611 | 11/2003 |
| WO | WO-2006054056 | 5/2006 |
| WO | WO-2006064334 | 6/2006 |
| WO | WO-2007052265 | 5/2007 |
| WO | WO-2007057500 | 5/2007 |
| WO | WO-2008021504 | 2/2008 |
| WO | WO-2008081070 | 7/2008 |
| WO | WO-2009029826 | 3/2009 |
| WO | WO-2009077601 | 6/2009 |
| WO | WO-2009127849 | 10/2009 |
| WO | WO-2010092409 | 8/2010 |
| WO | WO-2010125337 | 11/2010 |
| WO | WO-2011003381 | 1/2011 |
| WO | WO-2011041466 | 4/2011 |
| WO | 2011/0051660 | 5/2011 |
| WO | 2011/0110728 | 5/2011 |
| WO | WO-2011051660 | 5/2011 |
| WO | WO-2011090455 | 7/2011 |
| WO | WO-2011110728 | 9/2011 |
| WO | WO-2011131978 | 10/2011 |
| WO | WO-2012172295 | 12/2012 |
| WO | WO-2012177811 | 12/2012 |
| WO | WO-2013033274 | 3/2013 |
| WO | WO-2013058769 | 4/2013 |
| WO | WO-2013093906 | 6/2013 |
| WO | WO-2013164665 | 11/2013 |
| WO | WO-2014051920 | 4/2014 |
| WO | WO-2014085502 | 6/2014 |
| WO | WO-2014088343 | 6/2014 |
| WO | WO-2014111163 | 7/2014 |
| WO | WO-2014130383 | 8/2014 |
| WO | WO-2015091669 | 6/2015 |
| WO | WO-2016014368 | 1/2016 |
| WO | WO-2016064575 | 4/2016 |

OTHER PUBLICATIONS

"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.

"Always Connected", Available at: http://www.samsung.com/global/microsite/galaxycamera/nx/, Jun. 24, 2013, 5 pages.

"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.

"Corrected Notice of Allowance", U.S. Appl. No. 13/336,873, dated Sep. 11, 2015, 4 pages.

"Display Control", Retrieved From: <http://www.portrait.com/technology/display-control.html> Jul. 4, 2014, Jun. 24, 2013, 5 Pages.

"Final Office Action", U.S. Appl. No. 13/722,917, dated Sep. 23, 2015, 14 pages.

"Foreign Office Action", EP Application No. 13765041.2, dated Aug. 5, 2015, 6 pages.

"Manage Multiple Windows", Retrieved From: <http://windows.microsoft.com/en-hk/windows/manage-multiple-windows#1TC=windows-7> Jul. 8, 2014, 4 Pages.

"Merge Operator", Retrieved on: Jun. 3, 2014, Available at: https://github.com/facebook/rocksdb/wiki/Merge-Operator, 10 pages.

"Non-Final Office Action", U.S. Appl. No. 13/397,516, dated Sep. 24, 2015, 14 pages.

"Notice of Allowance", U.S. Appl. No. 13/336,873, dated Jul. 31, 2015, 6 pages.

"Organize Your Desktop Workspace for More Comfort with WindowSpace", Retrieved From: <http://www.ntwind.com/software/windowspace.html> Jul. 4, 2014, Sep. 19, 2008, 5 pages.

"Restriction Requirement", U.S. Appl. No. 13/420,388, dated Aug. 13, 2015, 6 pages.

"Restriction Requirement", U.S. Appl. No. 14/447,419, dated Aug. 4, 2015, 6 pages.

"SizeUp the Missing Window Manager", Retrieved From: <https://www.irradiatedsoftware.com/sizeup/> Jul. 4, 2014, Jan. 17, 2013, 4 Pages.

"Supplementary European Search Report", EP Application No. 13765041.2, Jul. 21, 2015, 3 pages.

"Using Flickr to Organize a Collection of Images", Available at: http://www.jiscdigitalmedia.ac.uk/guide/using-flickr-to-organise-a-collection-of-images, Apr. 2, 2013, 17 pages.

"Window Magnet", Retrieved From: <http://magnet.crowdcafe.com/> Jul. 4, 2014, Jun. 23, 2011, 2 Pages.

"Windows 7: Display Reminder When Click on Shutdown?", Retrieved From: <http://www.sevenforums.com/customization/118688-display-reminder-when-click-shutdown.html>Jul. 8, 2014, Oct. 18, 2010, 5 Pages.

"Working with Windows", Retrieved From: <http://windows.microsoft.com/en-us/windows/working-with-windows#1TC=windows-7> Jul. 4, 2014, 10 Pages.

Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.

Callaghan,"Types of writes", Available at: http://smalldatum.blogspot.in/2014/04/types-of-writes.html, Apr. 17, 2014, 3 pages.

Cohen,"Automatic Strategies in the Siemens RTL Tiled Window Manager", in Proceedings: The 2nd IEEE Conference on Computer Workstations, Mar. 7, 1988, pp. 111-119.

Eckel,"Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.

(56) References Cited

OTHER PUBLICATIONS

Elnaka,"Real-Time Traffic Classification for Unified Communication Networks", in Proceedings of International Conference on Selected Topics in Mobile and Wireless Networking, Aug. 19, 2013, 6 pages.
Hepburn,"Color: The Location Based Social Photo App", Available at: http://www.digitalbuzzblog.com/color-the-location-based-social-photo-iphone-app/, Mar. 27, 2011, 12 pages.
Johnson,"Samsung Galaxy Tab Pro 10.1 Review", Retrieved From: <http://hothardware.com/Reviews/Samsung-Galaxy-Tab-Pro-101-Review/?page=3#!baG2DY > Jul. 9, 2014, Mar. 21, 2014, 10 Pages.
Kandogan,"Elastic Windows: Improved Spatial Layout and Rapid Multiple Window Operations", in Proceedings of the Workshop on Advanced Visual Interfaces, May 27, 1996, 10 Pages.
Levandoski,"Latch-Free, Log-Structured Storage for Multiple Access Methods", U.S. Appl. No. 13/924,567, filed Jun. 22, 2013, 51 pages.
Levandoski,"The Bw-Tree: A B-tree for New Hardware Platforms", in IEEE 29th International Conference on Data Engineering, Apr. 8, 2013, 12 pages.
Li,"QRON: QoS-Aware Routing in Overlay Networks", in Proceedings of IEEE Journal on Selected Areas in Communications, vol. 22, No. 1, Jan. 2004, 12 pages.
Mack,"Moto X: The First Two Weeks", Retrieved From: <http://www.gizmag.com/two-weeks-motorola-google-moto-x-review/28722/> Jul. 8, 2014, Aug. 16, 2013, 8 pages.
O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.
Paul,"Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.
Prohaska,"Fast Updates with TokuDB", Available at: http://www.tokutek.com/2013/02/fast-updates-with-tokudb/, Feb. 12, 2013, 2 pages.
Thurrott,"Nokia Lumia "Black": Glance 2.0", Retrieved From:<http://winsupersite.com/windows-phone/nokia-lumia-black-glance-20> Jul. 8, 2014, Jan. 11, 2014, 3 Pages.
Vranjes,"Application Window Divider Control for Window Layout Management", U.S. Appl. No. 13/863,369, filed Apr. 15, 2013, 21 pages.
Wiebe,"Using screen space efficiently with Gridmove", Available at: http://lowerthought.wordpress.com/2010/05/15/using-screen-space-efficiently-with-gridmove/, May 15, 2010, 2 pages.
"Corrected Notice of Allowance", U.S. Appl. No. 14/617,574, dated Oct. 21, 2016, 2 pages.
"Examiner's Answer to Appeal Brief", U.S. Appl. No. 13/428,879, dated Oct. 12, 2016, 18 pages.
"Examiner's Answer to Appeal Brief", U.S. Appl. No. 13/477,646, dated Oct. 26, 2016, 12 pages.
"Final Office Action", U.S. Appl. No. 13/229,554, dated Feb. 27, 2015, 29 pages.
"Final Office Action", U.S. Appl. No. 13/229,554, dated Jun. 16, 2016, 35 pages.
"International Preliminary Report on Patentability", Application No. PCT/US2015/041930, dated Oct. 26, 2016, 9 pages.
"Non-Final Office Action", U.S. Appl. No. 13/229,554, dated Feb. 3, 2016, 33 pages.
"Non-Final Office Action", U.S. Appl. No. 14/746,298, dated Aug. 28, 2015, 6 pages.
"Notice of Allowance", U.S. Appl. No. 13/420,388, dated Oct. 6, 2016, 5 pages.
"Notice of Allowance", U.S. Appl. No. 14/617,710, dated Oct. 7, 2016, 9 pages.
"Notice of Allowance", U.S. Appl. No. 14/635,474, dated Oct. 17, 2016, 10 pages.
"Notice of Allowance", U.S. Appl. No. 15/171,924, dated Oct. 21, 2016, 8 pages.
"Final Office Action", U.S. Appl. No. 13/432,311, dated Dec. 18, 2015, 9 pages.
"International Search Report and Written Opinion", Application No. PCT/US2015/042371, dated Oct. 2, 2015, 10 pages.
"International Search Report and Written Opinion", Application No. PCT/US2015/042187, dated Oct. 20, 2015, 10 pages.
"International Search Report and Written Opinion", Application No. PCT/US2015/042226, dated Oct. 27, 2015, 10 Pages.
"International Search Report and Written Opinion", Application No. PCT/US2015/042205, dated Oct. 30, 2015, 10 pages.
"International Search Report and Written Opinion", Application No. PCT/US2015/042218, dated Nov. 6, 2015, 10 pages.
"International Search Report and Written Opinion", Application No. PCT/US2015/042259, dated Oct. 12, 2015, 11 pages.
"International Search Report and Written Opinion", Application No. PCT/US2015/041046, dated Nov. 9, 2015, 15 pages.
"Non-Final Office Action", U.S. Appl. No. 13/722,917, dated Feb. 9, 2016, 17 pages.
"Non-Final Office Action", U.S. Appl. No. 14/447,419, dated Feb. 2, 2016, 8 pages.
"Notice of Allowance", U.S. Appl. No. 13/397,516, dated Feb. 1, 2016, 7 pages.
"Notice of Allowance", U.S. Appl. No. 14/617,723, dated Feb. 9, 2016, 10 pages.
"Supplemental Notice of Allowance", U.S. Appl. No. 13/397,495, dated Jan. 26, 2016, 4 pages.
"Supplemental Notice of Allowance", U.S. Appl. No. 14/447,464, dated Jan. 12, 2016, 2 pages.
Antonopoulos,"Efficient Updates for Web-Scale Indexes over the Cloud", IEEE 28th International Conference on Data Engineering Workshops, Apr. 2012, 8 pages.
Garcia,"COMET: Content Mediator Architecture for Content-Aware Networks", in IEEE Future Network & Mobile Summit, 2011, 8 pages.
Levandoski,"Ranking and New Database Architectures", in Proceedings of the 7th International Workshop on Ranking in Databases, Aug. 2013, 4 pages.
"Advisory Action", U.S. Appl. No. 13/432,311, dated Mar. 24, 2016, 3 pages.
"Corrected Notice of Allowance", U.S. Appl. No. 13/397,495, dated Mar. 3, 2016, 4 pages.
"Corrected Notice of Allowance", U.S. Appl. No. 13/397,516, dated Mar. 3, 2016, 2 pages.
"Corrected Notice of Allowance", U.S. Appl. No. 14/617,723, dated Apr. 20, 2016, 7 pages.
"Final Office Action", U.S. Appl. No. 13/397,539, dated Apr. 21, 2016, 14 pages.
"Final Office Action", U.S. Appl. No. 13/420,388, dated Apr. 21, 2016, 9 pages.
"International Search Report and Written Opinion", Application No. PCT/US2016/015496, dated Apr. 11, 2016, 11 pages.
"International Search Report and Written Opinion", Application No. PCT/US2016/016241, dated Apr. 20, 2016, 12 pages.
"Non-Final Office Action", U.S. Appl. No. 13/440,165, dated Mar. 28, 2016, 13 pages.
"Non-Final Office Action", U.S. Appl. No. 14/617,574, dated Feb. 26, 2016, 22 pages.
"Non-Final Office Action", U.S. Appl. No. 14/617,710, dated Mar. 2, 2016, 16 pages.
"Notice of Allowance", U.S. Appl. No. 14/617,697, dated Feb. 29, 2016, 7 pages.
"Notice of Allowance", U.S. Appl. No. 14/617,735, dated Apr. 5, 2016, 12 pages.
"Notice of Allowance", U.S. Appl. No. 14/617,746, dated Apr. 11, 2016, 7 pages.
"Supplemental Notice of Allowance", U.S. Appl. No. 14/134,993, dated Mar. 2, 2016, 6 pages.
"Corrected Notice of Allowance", U.S. Appl. No. 14/617,735, dated Jul. 21, 2016, 2 pages.
"Final Office Action", U.S. Appl. No. 14/617,710, dated Aug. 2, 2016, 19 pages.

(56) References Cited

OTHER PUBLICATIONS

"Foreign Office Action", CN Application No. 201380017348.5, dated Jun. 17, 2016, 7 pages.
"Foreign Office Action", EP Application No. 13765041.2, dated Aug. 4, 2016, 5 pages.
"Non-Final Office Action", U.S. Appl. No. 14/617,666, dated Jul. 26, 2016, 21 pages.
"Non-Final Office Action", U.S. Appl. No. 14/617,683, dated Aug. 3, 2016, 14 pages.
"Non-Final Office Action", U.S. Appl. No. 15/171,924, dated Jul. 13, 2016, 8 pages.
"Notice of Allowance", U.S. Appl. No. 14/617,574, dated Jul. 20, 2016, 13 pages.
"Notice of Allowance", U.S. Appl. No. 14/617,697, dated Jul. 22, 2016, 5 pages.
"Restriction Requirement", U.S. Appl. No. 14/635,474, dated Jul. 12, 2016, 5 pages.
"Second Written Opinion", Application No. PCT/US2015/041909, dated Jun. 21, 2016, 6 pages.
"Second Written Opinion", Application No. PCT/US2015/041930, dated Jun. 21, 2016, 5 pages.
Berger,"Photonic Band Gaps and Holography", Journal of Applied Physics 82 (1), Jul. 1997, 6 pages.
"International Search Report and Written Opinion", Application No. PCT/US2014/016658, 10 pages.
"Non-Final Office Action", U.S. Appl. No. 13/774,875, dated Nov. 24, 2014, 8 pages.
Hua, et al., "Engineering of Head-mounted Projective Displays", in Proceedings of Applied Optics, vol. 39, No. 22, Aug. 1, 2000, 11 pages.
Jarvenpaa, et al., "Compact near-to-eye display with integrated gaze tracker", Second International Conference on Computer Engineering and Applications, Mar. 19, 2010, 9 pages.
Lanman, et al., "Near-eye Light Field Displays", in Journal of ACM Transactions on Graphics, vol. 32, No. 6, Nov. 2013, 10 pages.
"Foreign Office Action", EP Application No. 13769961.7, dated Mar. 11, 2015, 8 pages.
"Non-Final Office Action", U.S. Appl. No. 13/336,873, dated Apr. 9, 2015, 18 pages.
"Non-Final Office Action", U.S. Appl. No. 13/397,495, dated Apr. 3, 2015, 11 pages.
"Supplementary European Search Report", EP Application No. 13769961.7, dated Mar. 3, 2015, 3 pages.
"Corrected Notice of Allowance", U.S. Appl. No. 14/617,574, dated Sep. 12, 2016, 10 pages.
"Final Office Action", U.S. Appl. No. 13/397,617, dated Sep. 21, 2016, 10 pages.
"Final Office Action", U.S. Appl. No. 14/,447,419, dated Aug. 29, 2016, 11 pages.
"Foreign Office Action", CN Application No. 201380015757.1, dated Jul. 11, 2016, 13 pages.
"Foreign Office Action", CN Application No. 201380017348.5, dated Jan. 14, 2016, 12 pages.
"Foreign Office Action", CN Application No. 201380067523.1, dated Aug. 22, 2016, 13 pages.
"International Search Report and Written Opinion", Application No. PCT/US2015/054350, dated Feb. 5, 2016, 9 pages.
"Non-Final Office Action", U.S. Appl. No. 13/397,539, dated Sep. 9, 2016, 16 pages.
"Non-Final Office Action", U.S. Appl. No. 13/432,311, dated Aug. 17, 2016, 18 pages.
"Non-Final Office Action", U.S. Appl. No. 13/440,165, dated Sep. 22, 2016, 13 pages.
"Non-Final Office Action", U.S. Appl. No. 14/617,606, dated Sep. 9, 2016, 12 pages.
"Second Written Opinion", Application No. PCT/US2015/041900, dated Jun. 30, 2016, 6 pages.
March,"A Read-Only Distributed Has Table", in Journal of Grip Computing, vol. 9, Issue 4, Apr. 27, 2011, pp. 501-529.
"Corrected Notice of Allowance", U.S. Appl. No. 13/397,516, dated May 16, 2016, 2 pages.
"Corrected Notice of Allowance", U.S. Appl. No. 14/617,735, dated Jun. 20, 2016, 2 pages.
"Final Office Action", U.S. Appl. No. 13/722,917, dated Jun. 17, 2016, 19 pages.
"Final Office Action", U.S. Appl. No. 13/774,875, dated Apr. 22, 2016, 10 pages.
"Final Office Action", U.S. Appl. No. 14/447,419, dated May 17, 2016, 10 pages.
"International Search Report and Written Opinion", Application No. PCT/US2016/015873, dated May 23, 2016, 11 pages.
"International Search Report and Written Opinion", Application No. PCT/US2016/016028, dated May 25, 2016, 11 pages.
"International Search Report and Written Opinion", Application No. PCT/US2016/015869, dated May 12, 2016, 12 pages.
"International Search Report and Written Opinion", Application No. PCT/US2016/016029, dated May 12, 2016, 12 pages.
"International Search Report and Written Opinion", Application No. PCT/US2016/016027, dated May 17, 2016, 13 pages.
"International Search Report and Written Opinion", Application No. PCT/US2016/015871, dated Jun. 13, 2016, 13 pages.
"International Search Report and Written Opinion", Application No. PCT/US2016/019006, dated May 12, 2016, 14 pages.
"International Search Report and Written Opinion", Application No. PCT/US2016/016242, dated May 27, 2016, 14 pages.
"International Search Report and Written Opinion", Application No. PCT/US2016/015497, dated May 19, 2016, 17 pages.
"Non-Final Office Action", U.S. Appl. No. 13/397,617, dated May 18, 2016, 8 pages.
"Non-Final Office Action", U.S. Appl. No. 14/335,927, dated Jun. 3, 2016, 8 pages.
"Non-Final Office Action", U.S. Appl. No. 14/617,606, dated May 23, 2016, 12 pages.
"Notice of Allowance", U.S. Appl. No. 14/617,723, dated May 24, 2016, 7 pages.
"Restriction Requirement", U.S. Appl. No. 14/617,683, dated May 9, 2016, 6 pages.
Kim,"Determination of small angular displacement by moire fringes of matched radial-parallel gratings", Applied Optics, vol. 36, No. 13, May 1997, 8 pages.
Levola,"Diffractive optics for virtual reality displays", Journal of the Society for Information Display—SID, Jan. 1, 2006, 9 pages.
Theocaris,"Radial Gratings as Moire Gauges", Journal of Physics E. Scientific Instruments, Jun. 1, 1968, 6 pages.
"Final Office Action", U.S. Appl. No. 13/397,539, dated Jun. 29, 2015, 11 pages.
"Final Office Action", U.S. Appl. No. 13/440,165, dated Jul. 21, 2015, 11 pages.
"Final Office Action", U.S. Appl. No. 13/774,875, dated Jun. 4, 2015, 10 pages.
"Final Office Action", U.S. Appl. No. 14/134,993, dated Jul. 16, 2015, 19 pages.
"Foreign Office Action", EP Application No. 13769961.7, dated Jun. 30, 2015, 6 pages.
"New Technology from MIT may Enable Cheap, Color, Holographic Video Displays", Retrieved from <http://www.gizmag.com/holograph-3d-color-video-display-inexpensive-mit/28029/> on Feb. 25, 2015, Jun. 24, 2013, 8 pages.
"Non-Final Office Action", U.S. Appl. No. 13/397,617, dated May 5, 2015, 6 pages.
"Non-Final Office Action", U.S. Appl. No. 13/428,879, dated Jun. 26, 2015, 13 pages.
"Non-Final Office Action", U.S. Appl. No. 13/432,311, dated Jun. 2, 2015, 25 pages.
"Non-Final Office Action", U.S. Appl. No. 13/477,646, dated Jun. 18, 2015, 43 pages.
"Non-Final Office Action", U.S. Appl. No. 13/722,917, dated May 21, 2015, 12 pages.
"Variable Groove Depth (VGD) Master Gratings", Retrieved From: <http://www.horiba.com/scientific/products/diffraction-gratings/catalog/variable-groove-depth-vgd/> May 28, 2014, 2 pages.

(56) References Cited

OTHER PUBLICATIONS

Chang-Yen,"A Monolithic PDMS Waveguide System Fabricated Using Soft-Lithography Techniques", in Journal of Lightwave Technology, vol. 23, No. 6, Jun. 2005, 6 pages.
Charles,"Design of Optically Path Length Matched, Three-Dimensional Photonic Circuits Comprising Uniquely Routed Waveguides", in Proceedings of Applied Optics, vol. 51, Issue 27, Sep. 20, 2012, 11 pages.
Chen,"A Study of Fiber-to-Fiber Losses in Waveguide Grating Routers", in Journal of Lightwave Technology, vol. 15, No. 10, Oct. 1997, 5 pages.
Cottier,"Label-free Highly Sensitive Detection of (small) Molecules by Wavelength Interrogation of Integrated Optical Chips", n Proceedings of Sensors and Actuators B: Chemical, vol. 91, Issue 1-3, Jun. 1, 2003, pp. 241-251.
Dumon,"Compact Arrayed Waveguide Grating Devices in Silicon-on-Insulator", in Proceedings of the IEEE/LEOS Symposium Benelux Chapter, May 27, 2014, 4 pages.
Glendenning,"Polymer Micro-Optics via Micro Injection Moulding", Available at: https://web.archive.org/web/20120310003606/http://www.microsystems.uk.com/english/polymer_optics_injection_moulding.html, Jan. 10, 2011, 6 pages.
Grabarnik,"Concave Diffraction Gratings Fabricated With Planar Lithography", in Proceedings of SPIE, vol. 6992, May 3, 2008, 8 pages.
Greiner,"Bandpass engineering of lithographically scribed channel-waveguide Bragg gratings", in Proceedings of Optics Letters, vol. 29, No. 8, Apr. 15, 2004, pp. 806-808.
Ismail,"Improved Arrayed-Waveguide-Grating Layout Avoiding Systematic Phase Errors", in Proceedings of Optics Express, vol. 19, No. 9, Apr. 25, 2011, pp. 8781-8794.
L,"All-Nanoparticle Concave Diffraction Grating Fabricated by Self-Assembly onto Magnetically-Recorded Templates", in Proceedings of Optical Express, vol. 21, Issue 1, Jan. 2013, 1 page.
Lindau,"Controlling the Groove Depth of Holographic Gratings", in Proceedings of Optical System Design, Analysis, and Production, vol. 0399, Oct. 26, 1983, 2 pages.
Mei,"An all fiber interferometric gradient hydrophone with optical path length compensation", in Proceedings of Summaries of Papers Presented at the Conference on Lasers and Electro-Optics, May 28, 1999, 2 pages.
Morga,"History of SAW Devices", in Proceedings of the IEEE International Frequency Control Symposium, May 27, 1998, 22 pages.
Smalley,"Anisotropic Leaky-Mode Modulator for Holographic Video Displays", in Proceedings of Nature, vol. 498, Jun. 20, 2013, 6 pages.
Teng,"Fabrication of nanoscale zero-mode waveguides using microlithography for single molecule sensing", in Proceedings of Nanotechnology, vol. 23, No. 45, Jul. 7, 2012, 7 pages.
Tien,"Microcontact Printing of SAMs", in Proceedings of Thin Films, vol. 24, May 28, 2014, 24 pages.
Xie,"Fabrication of Varied-Line-Spacing Grating by Elastic Medium", in Proceedings SPIE 5636, Holography, Diffractive Optics, and Applications II, Nov. 2004, 4 pages.
"Advisory Action", U.S. Appl. No. 13/428,879, dated Sep. 19, 2014, 3 pages.
"Augmented Reality and Physical Games", U.S. Appl. No. 13/440,165, filed Apr. 5, 2012, 49 pages.
"BragGrate Mirror", Retrieved from <http://web.archive.org/web/20090814104232/http://www.optigrate.com/BragGrate_Mirror.html> on Jul. 8, 2014, Aug. 14, 2009, 2 pages.
"Corrected Final Office Action", U.S. Appl. No. 13/432,311, dated Dec. 24, 2014, 25 pages.
"Corrected Notice of Allowance", U.S. Appl. No. 13/355,836, dated Sep. 11, 2014, 2 pages.
"Corrected Notice of Allowance", U.S. Appl. No. 13/355,836, dated Dec. 15, 2014, 2 pages.
"DigiLens", SBG Labs, retrieved from <http://www.digilens.com/products.html> on Jun. 19, 2012, 1 page.
"Final Office Action", U.S. Appl. No. 13/336,873, dated Jan. 5, 2015, 21 pages.
"Final Office Action", U.S. Appl. No. 13/336,895, dated May 27, 2014, 11 pages.
"Final Office Action", U.S. Appl. No. 13/355,836, dated Mar. 10, 2014, 18 pages.
"Final Office Action", U.S. Appl. No. 13/355,914, dated Feb. 23, 2015, 21 pages.
"Final Office Action", U.S. Appl. No. 13/355,914, dated Jun. 19, 2014, 11 pages.
"Final Office Action", U.S. Appl. No. 13/397,495, dated May 29, 2014, 10 pages.
"Final Office Action", U.S. Appl. No. 13/397,516, dated Jan. 29, 2015, 13 pages.
"Final Office Action", U.S. Appl. No. 13/428,879, dated Jul. 14, 2014, 12 pages.
"Final Office Action", U.S. Appl. No. 13/432,311, dated Dec. 15, 2014, 24 pages.
"Final Office Action", U.S. Appl. No. 13/432,372, dated Jan. 29, 2015, 33 pages.
"Final Office Action", U.S. Appl. No. 13/440,165, dated Jun. 6, 2014, 12 pages.
"Final Office Action", U.S. Appl. No. 13/477,646, dated Feb. 23, 2015, 36 pages.
"Final Office Action", U.S. Appl. No. 13/477,646, dated May 5, 2014, 26 pages.
"Final Office Action", U.S. Appl. No. 13/525,649, dated Oct. 9, 2014, 8 pages.
"Final Office Action", U.S. Appl. No. 14/134,993, dated Aug. 20, 2014, 15 pages.
"Foreign Notice of Allowance", CN Application No. 201320034345.X, dated Aug. 14, 2013, 2 Pages.
"Foreign Office Action", CN Application No. 201210563730.3, dated Jan. 7, 2015, 16 pages.
"Foreign Office Action", CN Application No. 201210567932.5, dated Aug. 14, 2014, 12 pages.
"HDTV Helmet Mounted Display", Available at <http://defense-update.com/products/h/HDTV-HMD.htm>,Jan. 26, 2005, 1 page.
"International Search Report and Written Opinion", Application No. PCT/US2012/069331, dated Mar. 29, 2013, 10 pages.
"International Search Report and Written Opinion", Application No. PCT/US2013/053676, dated Oct. 16, 2013, 10 pages.
"International Search Report and Written Opinion", Application No. PCT/US2013/030632, dated Jun. 26, 2013, 10 pages.
"International Search Report and Written Opinion", Application No. PCT/US2013/028477, dated Jun. 21, 2013, 11 pages.
"International Search Report and Written Opinion", Application No. PCT/US2013/031111, dated Jun. 26, 2013, 11 pages.
"International Search Report and Written Opinion", Application No. PCT/US2013/076832, dated Mar. 17, 2014, 12 pages.
"International Search Report and Written Opinion", Application No. PCT/US2013/061225, dated Jun. 4, 2014, 12 pages.
"International Search Report and Written Opinion", Application No. PCT/US2012/071563, dated Apr. 25, 2013, 13 pages.
"International Search Report and Written Opinion", Application No. PCT/US2013/021784, dated Apr. 30, 2013, 9 pages.
"International Search Report and Written Opinion", Application No. PCT/US2012/069330, dated Mar. 28, 2013, 9 pages.
"International Search Report and Written Opinion", Application No. PCT/US2013/021783, dated May 15, 2013, 9 pages.
"International Search Report and Written Opinion", Application No. PCT/US2013/026200, dated Jun. 3, 2013, 9 pages.
"Light Guide Techniques using LED Lamps", Application Brief I-003, retrieved from <http://www.ciri.org.nz/downloads/Lightpipe%20design.pdf> on Jan. 12, 2012,Oct. 14, 2008, 22 pages.
"Non-Final Office Action", U.S. Appl. No. 13/397,495, dated Nov. 13, 2013, 8 pages.
"Non-Final Office Action", U.S. Appl. No. 13/440,165, dated Feb. 6, 2014, 12 pages.
"Non-Final Office Action", U.S. Appl. No. 13/336,873, dated Jul. 25, 2014, 16 pages.
"Non-Final Office Action", U.S. Appl. No. 13/336,895, dated Oct. 24, 2013, 9 pages.

(56) References Cited

OTHER PUBLICATIONS

"Non-Final Office Action", U.S. Appl. No. 13/343,675, dated Jul. 16, 2013, 9 pages.
"Non-Final Office Action", U.S. Appl. No. 13/355,836, dated Nov. 4, 2013, 15 pages.
"Non-Final Office Action", U.S. Appl. No. 13/355,914, dated Feb. 14, 2014, 10 pages.
"Non-Final Office Action", U.S. Appl. No. 13/355,914, dated Oct. 28, 2014, 18 pages.
"Non-Final Office Action", U.S. Appl. No. 13/397,516, dated Jun. 12, 2014, 11 pages.
"Non-Final Office Action", U.S. Appl. No. 13/397,516, dated Nov. 25, 2013, 10 pages.
"Non-Final Office Action", U.S. Appl. No. 13/397,539, dated Mar. 16, 2015, 9 pages.
"Non-Final Office Action", U.S. Appl. No. 13/397,617, dated Oct. 9, 2014, 6 pages.
"Non-Final Office Action", U.S. Appl. No. 13/428,879, dated Feb. 24, 2015, 10 pages.
"Non-Final Office Action", U.S. Appl. No. 13/428,879, dated Mar. 17, 2014, 10 pages.
"Non-Final Office Action", U.S. Appl. No. 13/432,311, dated Jul. 8, 2014, 33 pages.
"Non-Final Office Action", U.S. Appl. No. 13/432,372, dated May 9, 2014, 26 pages.
"Non-Final Office Action", U.S. Appl. No. 13/432,372, dated Oct. 24, 2014, 27 pages.
"Non-Final Office Action", U.S. Appl. No. 13/440,165, dated Feb. 13, 2015, 10 pages.
"Non-Final Office Action", U.S. Appl. No. 13/440,165, dated Oct. 16, 2014, 11 pages.
"Non-Final Office Action", U.S. Appl. No. 13/477,646, dated Oct. 6, 2014, 34 pages.
"Non-Final Office Action", U.S. Appl. No. 13/477,646, dated Nov. 22, 2013, 20 pages.
"Non-Final Office Action", U.S. Appl. No. 13/525,649, dated Jan. 29, 2014, 7 pages.
"Non-Final Office Action", U.S. Appl. No. 13/525,649, dated Feb. 5, 2015, 7 pages.
"Non-Final Office Action", U.S. Appl. No. 13/525,649, dated Jun. 5, 2014, 7 pages.
"Non-Final Office Action", U.S. Appl. No. 13/570,073, dated Jan. 23, 2015, 7 pages.
"Non-Final Office Action", U.S. Appl. No. 13/631,308, dated Feb. 23, 2015, 9 pages.
"Non-Final Office Action", U.S. Appl. No. 14/134,993, dated Jan. 22, 2015, 17 pages.
"Non-Final Office Action", U.S. Appl. No. 14/134,993, dated Apr. 17, 2014, 34 pages.
"Notice of Allowance", U.S. Appl. No. 13/336,895, dated Aug. 11, 2014, 6 pages.
"Notice of Allowance", U.S. Appl. No. 13/343,675, dated Sep. 16, 2013, 8 pages.
"Notice of Allowance", U.S. Appl. No. 13/355,836, dated Jun. 13, 2014, 11 pages.
"Notice of Allowance", U.S. Appl. No. 13/355,836, dated Oct. 8, 2014, 11 pages.
"Notice of Allowance", U.S. Appl. No. 13/356,545, dated Mar. 28, 2014, 6 pages.
"Notice of Allowance", U.S. Appl. No. 13/488,145, dated Nov. 19, 2014, 8 pages.
"Restriction Requirement", U.S. Appl. No. 13/355,836, dated Sep. 27, 2013, 6 pages.
"Restriction Requirement", U.S. Appl. No. 13/397,539, dated Dec. 1, 2014, 6 pages.
"Restriction Requirement", U.S. Appl. No. 13/488,145, dated Sep. 8, 2014, 14 pages.
"Restriction Requirement", U.S. Appl. No. 13/570,073, dated Nov. 18, 2014, 7 pages.
"Supplemental Notice of Allowance", U.S. Appl. No. 13/356,545, dated Jul. 22, 2014, 2 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, dated Oct. 10, 2014, 6 Pages.
Allen, "ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>,Jun. 2007, pp. 155-159.
Aron, "'Sprinting' chips could push phones to the speed limit", New Scientist, Feb. 20, 2012, Issue #2852, Feb. 20, 2012, 2 pages.
Baluja, et al., "Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>,Jan. 5, 1994, 14 pages.
Barger, "COTS Cooling", Publication of the National Electronics Manufacturing Center of Excellence, Retrieved from: <http://www.empf.org/empfasis/2009/Oct09/cots.html > on Jul. 9, 2012,Oct. 2009, 4 pages.
Baudisch, et al., "Back-of-Device Interaction Allows Creating Very Small Touch Devices", in Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.
Chen, et al., "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.
Cheng, et al., "Waveguide Displays Based on Polymer-dispersed Liquid Crystals", SPIE Newsroom, Available at <http://spie.org/documents/Newsroom/Imported/003805/003805_10.pdf>,Aug. 12, 2011, 2 pages.
Chirgwin, "Researchers propose 'overclock' scheme for mobiles—Processing at a sprint to overcome tech limitations", The Register, Feb. 21, 2012, Feb. 21, 2012, 2 pages.
Coldewey, "Researchers Propose "Computational Sprinting" to Speed Up Chips by 1000%—But Only for a Second", TechCrunch, Feb. 28, 2012, Feb. 29, 2012, 2 pages.
Deagazio, "Selecting Display Backlighting for Portable, Handheld Devices", Hearst Electronics Products, retrieved from <http://www2.electronicproducts.com/Selecting_display_backlighting_for_portable_hand held_devices-article-farcglobal-feb2008-html.aspx> on Jan. 12, 2012,Jan. 2, 2008, 4 pages.
Eadicicco, "First Transparent Tablet Lets You Touch From Both Sides", Retrieved from <http://blog.laptopmag.com/first-transparent-tablet>, Dec. 26, 2013, 4 pages.
Greenemeier, "Could "Computational Sprinting" Speed Up Smart Phones without Burning Them Out?", Scientific American, Feb. 29, 2012, Feb. 29, 2012, 2 pages.
Han, et al., "Accurate diffraction efficiency control for multiplexed volume holographic gratings", Retrieved at: opticalengineering.spiedigitallibrary.org/data/Journals/.../2799_1, 2002, 4 pages.
Jacques, et al., "Polarized Light Imaging of Tissue", Available at <http://www.lumamed.com/documents/5_polarized%20light%20imaging.pdf>,2004, 17 pages.
Jaworski, et al., "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.
Karp, et al., "Planar Micro-optic Solar Concentration using Multiple Imaging Lenses into a Common Slab Waveguide", in Proceedings of SPIE vol. 7407, Available at <http://psilab.ucsd.edu/research/slab_concentration/files/SPIE_Slab_Published.pdf>,Jan. 2009, 11 pages.

(56) References Cited

OTHER PUBLICATIONS

Kress, et al., "Exit Pupil for Wearable See-through displays", Downloaded From: http://proceedings.spiedigitallibrary.org/ on Jan. 31, 2015 Terms of Use: http://spiedl.org/terms, 2012, 8 pages.

Krishnan, et al., "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.

Large, et al., "Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>,Jun. 21, 2010, pp. 1-7.

Lerner, "Penn Helps Rethink Smartphone Design With 'Computational Sprinting'", Penn News Release, Feb. 28, 2012, 2 pages.

Li, et al., "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >,Aug. 2009, pp. 335-340.

Li, et al., "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.

Man, et al., "IT Equipment Noise Emission Standards: Overview of New Development in the Next Edition of ISO/ECMA Standards", in Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.

Massenot, et al., "Multiplexed holographic transmission gratings recorded in holographic polymer-dispersed liquid crystals: static and dynamic studies", Retrieved at: http://oatao.univ-toulouse.fr/2874/, 2005, 8 pages.

McMillan, "Your Future iPhone May Be Stuffed With Wax", Aug. 23, 2013, 3 pages.

Melcher, "LCoS for High Performance Displays", in Proceedings of LEOS 2003, Available at <http://ieeexplore.ieee.org/stamp/stamp.jsp?tp=&arnumber=1253048>,Oct. 27, 2003, pp. 812-813.

Minier, et al., "Diffraction Characteristics of Superimposed Holographic gratings in Planar Optical waveguides", IEEE Photonics Technology Letters, vol. 4, No. 10, Oct. 1992, 4 pages.

Moore, "Computational sprinting pushes smartphones till they're tired", Michigan News Release, Feb. 28, 2012, 2 pages.

Nguyen, et al., "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>,Mar. 2000, pp. 86-90.

Owano, "Study explores computing bursts for smartphones", PhysOrg.com, Feb. 21, 2012, Feb. 21, 2012, 2 pages.

Papaefthymiou, et al., "Computational Sprinting on a Hardware/Software Testbed", in the Proceedings of the 18th Eighteenth International Conference on Architectural Support for Programming Languages and Operating Systems (ASPLOS), Mar. 2013., Mar. 2013, 12 pages.

Patrizio, "Researchers Working on Ways to Put 16-Core Processors in Smartphones", Brighthand, Mar. 18, 2012, Mar. 18, 2012, 2 pages.

Pu, et al., "Exposure schedule for multiplexing holograms in photopolymer films", Retrieved at: lo.epfl.ch/webdav/site/lo/shared/1996/OE_35_2824_Oct1996.pdf, Oct. 1996, 6 pages.

Raghavan, et al., "Computational Sprinting", in the Proceedings of the 18th Symposium on High Performance Computer Architecture (HPCA), Feb. 2012, Feb. 2012, 12 pages.

Raghavan, et al., "Designing for Responsiveness With Computational Sprinting", IEEE Micro's "Top Picks of 2012" Issue, May 2013, 8 pages.

Scott, et al., "RearType: Text Entry Using Keys on the Back of a Device", in Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.

Singh et al., "Laser-Based Head-Tracked 3D Display Research", Journal of Display Technology, vol. 6, No. 10, Available at <http://ieeexplore.ieee.org/stamp/stamp.jsp?tp=&arnumber=5462999>,Oct. 2010, pp. 531-543.

Stupar, et al., "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.

Tari, et al., "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.

Travis, et al., "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.

Travis, et al., "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.

Van "A Survey of Augmented Reality Technologies, Applications and Limitations", The International Journal of Virtual Reality, 2010, 9(2), Available at <http://www.ijyr.org/issues/issue2-2010/paper1%20.pdf>,Jun. 2010, pp. 1-19.

Walker, "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.

Westerinen, et al., "Light Guide Display and Field of View", U.S. Appl. No. 13/428,879, filed Mar. 23, 2012, 46 pages.

Wigdor, et al., "LucidTouch: A See-Through Mobile Device", in Proceedings of 20th Annual ACM symposium on User Interface Software and Technology, Retrieved from <http://dl.acm.org/citation.cfm?id=1294259>,Oct. 7, 2007, 10 pages.

Yan, et al., "Multiplexing holograms in the photopolymer with equal diffraction efficiency", 2005, 9 pages.

Zharkova, et al., "Study of the Dynamics of Transmission Gratings Growth on Holographic Polymer-Dispersed Liquid Crystals", International Conference on Methods of Aerophysical Research, ICMAR 2008, 2008, 4 pages.

"Corrected Notice of Allowance", U.S. Appl. No. 13/336,873, dated Nov. 27, 2015, 4 pages.

"Final Office Action", U.S. Appl. No. 13/397,617, dated Nov. 18, 2015, 11 pages.

"Final Office Action", U.S. Appl. No. 13/428,879, dated Dec. 10, 2015, 16 pages.

"Final Office Action", U.S. Appl. No. 13/477,646, dated Nov. 24, 2015, 39 pages.

"Final Office Action", U.S. Appl. No. 14/178,731, dated Aug. 12, 2015, 13 pages.

"Foreign Office Action", EP Application No. 13770174.4, dated Mar. 11, 2015, 8 pages.

"Foreign Office Action", EP Application No. 13770174.4, dated Jul. 1, 2015, 6 pages.

"International Search Report and Written Opinion", Application No. PCT/US2015/041930, dated Oct. 20, 2015, 12 Pages.

"International Search Report and Written Opinion", Application No. PCT/US2015/041900, dated Oct. 21, 2015, 12 pages.

"International Search Report and Written Opinion", Application No. PCT/US2015/041909, dated Oct. 20, 2015, 13 pages.

"International Search Report and Written Opinion", Application No. PCT/US2015/014699, dated May 4, 2015, 16 Pages.

(56) References Cited

OTHER PUBLICATIONS

"Non-Final Office Action", U.S. Appl. No. 13/397,539, dated Oct. 1, 2015, 12 pages.
"Non-Final Office Action", U.S. Appl. No. 13/420,388, dated Dec. 4, 2015, 7 pages.
"Non-Final Office Action", U.S. Appl. No. 13/432,372, dated Aug. 27, 2015, 35 pages.
"Non-Final Office Action", U.S. Appl. No. 13/774,875, dated Sep. 16, 2015, 8 pages.
"Non-Final Office Action", U.S. Appl. No. 14/178,731, dated Apr. 17, 2015, 10 pages.
"Notice of Allowance", U.S. Appl. No. 13/397,495, dated Oct. 20, 2015, 6 pages.
"Notice of Allowance", U.S. Appl. No. 14/134,993, dated Nov. 17, 2015, 9 pages.
"Notice of Allowance", U.S. Appl. No. 14/447,464, dated Nov. 9, 2015, 10 pages.
"Restriction Requirement", U.S. Appl. No. 14/617,697, dated Nov. 30, 2015, 6 pages.
"Supplementary European Search Report", EP Application No. 13770174.4, dated Mar. 3, 2015, 3 pages.
Ando,"Development of Three-Dimensional Microstages Using Inclined Deep-Reactive Ion Etching", Journal of Microelectromechanical Systems, Jun. 1, 2007, 10 pages.
Gila,"First Results From a Multi-Ion Beam Lithography and Processing System at the University of Florida", AIP Conference Proceedings, Jun. 1, 2011, 6 pages.
Travis,"Wedge Optics in Flat Panel Displays", Retrieved from: http://download.microsoft.com/download/4/B/4/4B49C1C2-4C7A-4CEA-ADB5-EF4E4E7F5F63/Wedge%20optics%20in%20flat%20panel%20displays.pdf, Jul. 14, 2011, 15 Pages.
"Corrected Notice of Allowance", U.S. Appl. No. 13/397,539, dated Apr. 12, 2017, 2 pages.
"Corrected Notice of Allowance", U.S. Appl. No. 14/617,710, dated Dec. 13, 2016, 2 pages.
"Corrected Notice of Allowance", U.S. Appl. No. 15/171,924, dated Mar. 31, 2017, 2 pages.
"Corrected Notice of Allowance", U.S. Appl. No. 15/171,924, dated Nov. 30, 2016, 2 pages.
"Examiner's Answer to Appeal Brief", U.S. Appl. No. 14/447,419, dated Feb. 27, 2017, 8 pages.
"Final Office Action", U.S. Appl. No. 14/617,606, dated Dec. 27, 2016, 13 pages.
"Final Office Action", U.S. Appl. No. 14/617,666, dated Dec. 12, 2016, 29 pages.
"Final Office Action", U.S. Appl. No. 14/617,683, dated Nov. 28, 2016, 16 pages.
"Foreign Notice of Allowance", TW Application No. 102101510, dated Mar. 23, 2017, 4 pages.
"Foreign Office Action", AU Application No. 2013361148, dated Feb. 15, 2017, 3 pages.
"Foreign Office Action", CN Application No. 201380017348.5, dated Oct. 18, 2016, 7 pages.
"Foreign Office Action", JP Application No. 2015-501688, dated Dec. 20, 2016, 8 pages.
"Foreign Office Action", TW Application No. 102101510, dated Dec. 6, 2016, 11 pages.
"International Preliminary Report on Patentability", Application No. PCT/US2015/041900, dated Oct. 11, 2016, 6 pages.
"International Preliminary Report on Patentability", Application No. PCT/US2015/042187, dated Oct. 31, 2016, 7 pages.
"Non-Final Office Action", U.S. Appl. No. 13/397,617, dated Jan. 12, 2017, 10 pages.
"Non-Final Office Action", U.S. Appl. No. 13/722,917, dated Dec. 6, 2016, 18 pages.
"Non-Final Office Action", U.S. Appl. No. 14/617,606, dated Mar. 27, 2017, 14 pages.
"Non-Final Office Action", U.S. Appl. No. 14/617,666, dated Mar. 22, 2017, 23 pages.
"Notice of Allowance", U.S. Appl. No. 13/397,539, dated Mar. 22, 2017, 7 pages.
"Notice of Allowance", U.S. Appl. No. 13/440,165, dated Mar. 23, 2017, 5 pages.
"Notice of Allowance", U.S. Appl. No. 15/171,924, dated Feb. 1, 2017, 8 pages.
"Restriction Requirement", U.S. Appl. No. 14/447,446, dated Feb. 9, 2017, 7 pages.
"Second Written Opinion", Application No. PCT/US2016/015496, dated Feb. 9, 2017, 7 pages.
"Second Written Opinion", Application No. PCT/US2016/015869, dated Jan. 20, 2017, 5 pages.
"Second Written Opinion", Application No. PCT/US2016/015871, dated Feb. 6, 2017, 8 pages.
"Second Written Opinion", Application No. PCT/US2016/015873, dated Feb. 6, 2017, 6 pages.
"Second Written Opinion", Application No. PCT/US2016/016028, dated Feb. 3, 2017, 5 pages.
"Second Written Opinion", Application No. PCT/US2016/016241, dated Feb. 9, 2017, 7 pages.
"Supplemental Notice of Allowance", U.S. Appl. No. 14/635,474, dated Feb. 2, 2017, 4 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
"Advisory Action", U.S. Appl. No. 13/432,311, dated Jul. 14, 2017, 3 pages.
"Corrected Notice of Allowance", U.S. Appl. No. 13/397,539, dated Jun. 29, 2017, 2 pages.
"Corrected Notice of Allowance", U.S. Appl. No. 13/397,617, dated Jul. 26, 2017, 3 pages.
"Corrected Notice of Allowance", U.S. Appl. No. 15/171,924, dated May 17, 2017, 2 pages.
"Final Office Action", U.S. Appl. No. 13/432,311, dated May 15, 2017, 22 pages.
"Final Office Action", U.S. Appl. No. 13/722,917, dated Jul. 12, 2017, 19 pages.
"Foreign Notice of Allowance", CN Application No. 201380067523.1, dated Jun. 2, 2017, 4 pages.
"Foreign Office Action", JP Application No. 2015-501688, dated Jul. 4, 2017, 6 pages.
"International Preliminary Report on Patentability", Application No. PCT/US2016/015871, dated May 15, 2017, 10 pages.
"International Preliminary Report on Patentability", Application No. PCT/US2016/019006, dated Jun. 6, 2017, 11 pages.
"International Preliminary Report on Patentability", Application No. PCT/US2016/015873, dated May 15, 2017, 8 pages.
"Non-Final Office Action", U.S. Appl. No. 14/447,446, dated Jun. 9, 2017, 15 pages.
"Non-Final Office Action", U.S. Appl. No. 14/670,242, dated Jun. 8, 2017, 26 pages.
"Notice of Allowance", U.S. Appl. No. 14/617,683, dated Aug. 9, 2017, 9 pages.
"Notice of Allowance", U.S. Appl. No. 15/432,756, dated Jun. 23, 2017, 8 pages.
Widnall,"Lecture L3—Vectors, Matrices and Coordinate Transformations", 16.07 Dynamics, 2009, 16 pages.
"Corrected Notice of Allowance", U.S. Appl. No. 13/397,617, dated Aug. 15, 2017, 2 pages.
"Corrected Notice of Allowance", U.S. Appl. No. 14/617,683, dated Aug. 21, 2017, 6 pages.
"Final Office Action", U.S. Appl. No. 14/617,606, dated Sep. 5, 2017, 15 pages.
"Foreign Notice of Allowance", AU Application No. 2013361148, dated Jul. 17, 2017, 3 pages.
"Foreign Office Action", JP Application No. 2015-503284, dated Aug. 16, 2017, 12 pages.
"Non-Final Office Action", U.S. Appl. No. 13/432,311, dated Sep. 20, 2017, 27 pages.
"Non-Final Office Action", U.S. Appl. No. 15/642,020, dated Oct. 6, 2017, 14 pages.
"Notice of Allowance", U.S. Appl. No. 14/448,913, dated Aug. 9, 2017, 10 pages.

(56) References Cited

OTHER PUBLICATIONS

"Corrected Notice of Allowance", U.S. Appl. No. 13/397,539, dated Apr. 24, 2017, 2 pages.
Foreign Office Action CN Application No. 201380067523.1, dated Apr. 17, 2017, 6 pages.
"Foreign Office Action", CN Application No. 201380015757.1, dated Mar. 27, 2017, 12 pages.
"International Preliminary Report on Patentability", Application No. PCT/US2016/016027, dated May 3, 2017, 8 pages.
"International Preliminary Report on Patentability", Application No. PCT/US2016/015496, dated May 4, 2017, 9 pages.
"International Preliminary Report on Patentability", Application No. PCT/US2016/016241, dated May 4, 2017, 9 pages.
"Non-Final Office Action", U.S. Appl. No. 14/617,683, dated Apr. 21, 2017, 13 pages.
"Notice of Allowance", U.S. Appl. No. 13/397,617, dated Apr. 25, 2017, 5 pages.
"Second Written Opinion", Application No. PCT/US2016/016027, dated Jan. 24, 2017, 5 pages.
"Second Written Opinion", Application No. PCT/US2016/019006, dated Feb. 20, 2017, 9 pages.
"Final Office Action", U.S. Appl. No. 14/447,446, dated Dec. 5, 2017, 15 pages.
"Foreign Office Action", AU Application No. 2013361148, dated Apr. 11, 2017, 3 pages.
"International Preliminary Report on Patentability", Application No. PCT/US2016/016029, dated Apr. 13, 2017, 9 pages.
"Second Written Opinion", Application No. PCT/US2016/016029, dated Jan. 20, 2017, 6 pages.
"Corrected Notice of Allowance", U.S. Appl. No. 14/617,683, dated Oct. 27, 2017, 6 pages.
"Final Office Action", U.S. Appl. No. 14/617,666, dated Nov. 20, 2017, 30 pages.
"Foreign Office Action", CN Application No. 201380015757.1, dated Dec. 19, 2017, 10 pages.
"Foreign Office Action", JP Application No. 2015-501688, dated Dec. 5, 2017, 7 pages.
"Foreign Office Action", JP Application No. 2015-549765, dated Nov. 1, 2017, 7 pages.
"Foreign Office Action", RU Application No. 2015124081, dated Nov. 14, 2017, 10 pages.
"Non-Final Office Action", U.S. Appl. No. 14/617,710, dated Oct. 20, 2017, 23 pages.
"Non-Final Office Action", U.S. Appl. No. 14/617,666, dated Feb. 9, 2018, 29 pages.

\* cited by examiner

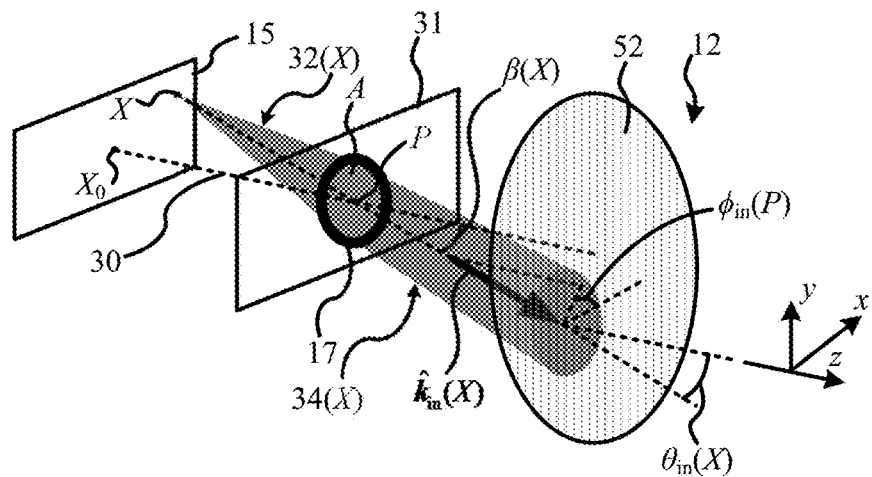
FIG. 7A
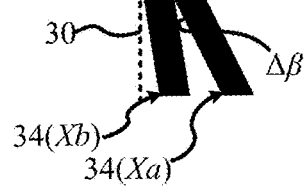
FIG. 7B
(Plan view)
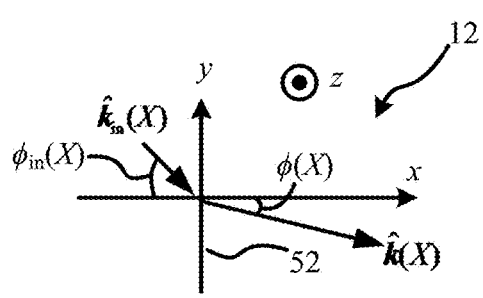
Fig. 7C
(Plan view)
Fig. 7D
(Frontal view)

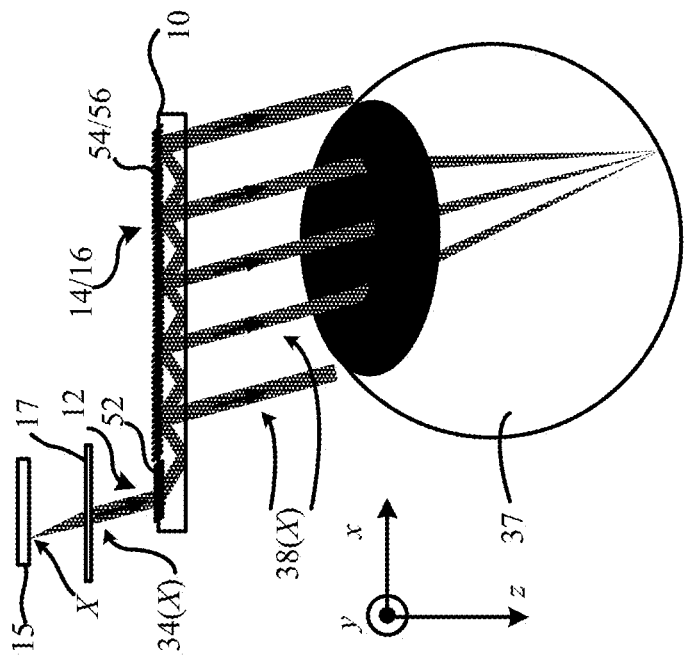
FIG. 7F (Plan view)
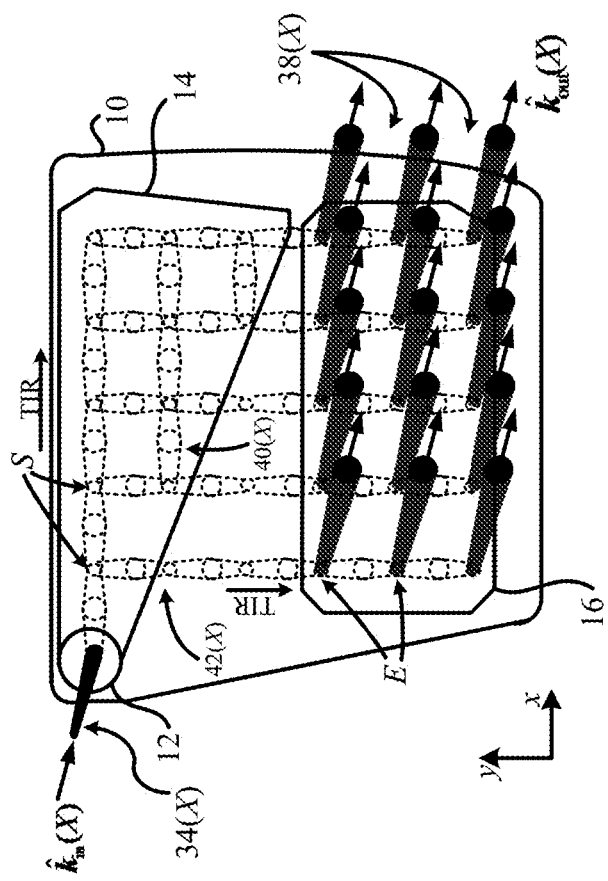
Fig. 7E (Frontal view)

(Plan view)

(Frontal view)

(Frontal view)

WEARABLE IMAGE DISPLAY SYSTEM

BACKGROUND

Display systems can used to make a desired image visible to a user (viewer). Wearable display systems can be embodied in a wearable headset which is arranged to display an image within a short distance from a human eye. Such wearable headsets are sometimes referred to as head mounted displays, and are provided with a frame which has a central portion fitting over a user's (wearer's) nose bridge and left and right support extensions which fit over a user's ears. Optical components are arranged in the frame so as to display an image within a few centimeters of the user's eyes. The image can be a computer generated image on a display, such as a micro display. The optical components are arranged to transport light of the desired image which is generated on the display to the user's eye to make the image visible to the user. The display on which the image is generated can form part of a light engine, such that the image itself generates collimated lights beams which can be guided by the optical component to provide an image visible to the user.

Different kinds of optical components have been used to convey the image from the display to the human eye. These can include lenses, mirrors, optical waveguides, holograms and diffraction gratings, for example. In some display systems, the optical components are fabricated using optics that allows the user to see the image but not to see through this optics at the "real world". Other types of display systems provide a view through its optics so that the generated image which is displayed to the user is overlaid onto a real world view. This is sometimes referred to as augmented reality.

Waveguide-based display systems typically transport light from a light engine to the eye via a TIR (Total Internal Reflection) mechanism in a waveguide (light guide). Such systems can incorporate diffraction gratings, which cause effective beam expansion so as to output expanded versions of the beams provided by the light engine. This means the image is visible over a wider area when looking at the waveguide's output than when looking at the light engine directly: provided the eye is within an area such that it can receive some light from substantially all (i.e. all or most) of the expanded beams, the whole image will be visible to the user. Such an area is referred to as an eye box.

In one type of head mounted display, the frames support two light engines, which each generate an image for a respective eye, with respective guiding mechanisms which each guide the image to project it at a proper location with respect to the associated eye so that the wearer's eyes operate in unison to receive a single non-distorted image.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

A wearable image display system comprises a headpiece, a first and a second light engine, and a first and a second optical component. The first and second light engines are configured to generate a first and a second set of beams respectively. Each beam is substantially collimated so that the first and second set form a first and a second virtual image respectively. The light engines are mounted on the headpiece. Each optical component is located to project an image onto a first and a second eye of a wearer respectively and comprises an incoupling structure and an exit structure. The first and second sets of beams are directed to the incoupling structures of the first and second optical components respectively. The exit structures of the first and second optical components are arranged to guide the first and second sets of beams onto the first and second eyes respectively. The optical components are located between the light engines and the eyes. Both of the light engines are mounted to a central portion of the headpiece.

BRIEF DESCRIPTION OF FIGURES

FIG. 7A shows a perspective view of a part of a display system;
FIG. 7B shows a plan view of individual pixels of a display;
FIGS. 7C and 7D show plan and frontal views of a beam interacting with an optical component;
FIG. 7E shows a frontal view of an optical component performing beam expansion;
FIG. 7F shows a plan view of an optical component performing beam expansion.

DETAILED DESCRIPTION

Typically, a waveguide based display system comprises an image source, e.g. a projector, waveguide(s) and various optical elements (e.g. diffraction gratings or holograms) imprinted on the waveguide surfaces. The optical elements are used, for example, to couple light emitted by the image source into and out of the waveguide, and/or for manipulation of its spatial distribution within the waveguide.

Figure 1:
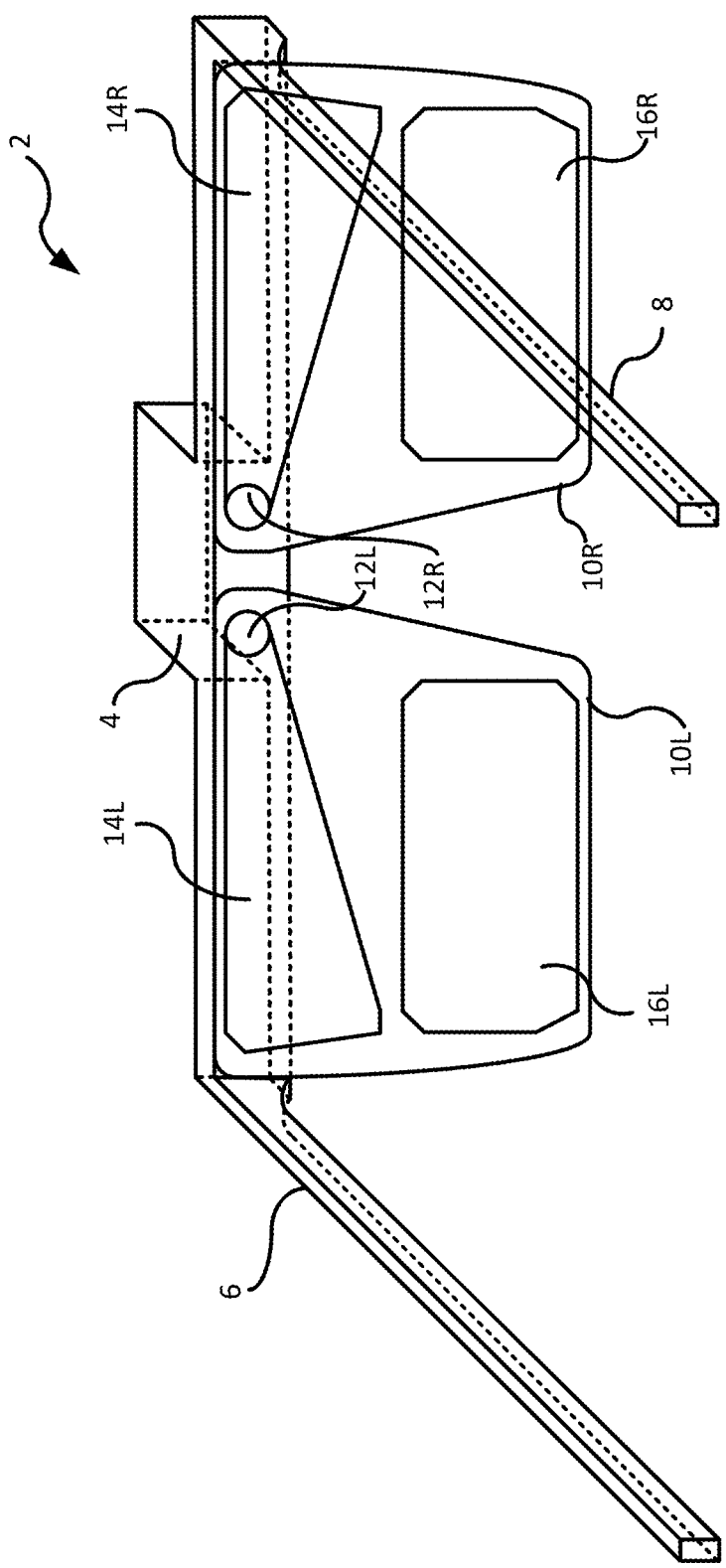
FIG. 1 shows a wearable display system.

FIG. 1 is a perspective view of a head mounted display. The head mounted display comprises a headpiece, which comprises a frame (2) having a central portion (4) intended to fit over the nose bridge of a wearer, and a left and right supporting extension (6, 8) which are intended to fit over a user's ears. Although the supporting extensions are shown to be substantially straight, they could terminate with curved parts to more comfortably fit over the ears in the manner of conventional spectacles.

The frame 2 supports left and right optical components, labelled 10L and 10R, which are waveguides e.g. formed of glass or polymer. For ease of reference herein an optical component 10 (which is a waveguide) will be considered to be either a left or right component, because the components are essentially identical apart from being mirror images of each other. Therefore, all description pertaining to the left-hand component also pertains to the right-hand component. The optical components will be described in more detail later with reference to FIG. 3. The central portion (4) houses two light engines which are not shown in FIG. 1 but one of which is shown in FIG. 2A.

Figure 2A:
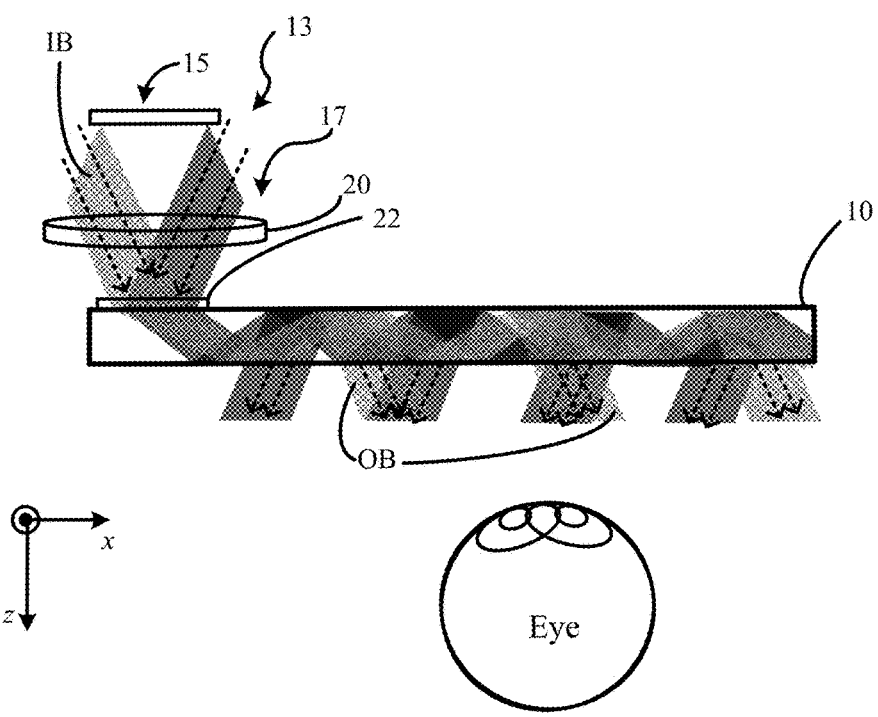
FIG. 2A shows a plan view of part of the display system.

FIG. 2A shows a plan view of a section of the top part of the frame of FIG. 1. Thus, FIG. 2A shows the light engine 13 which comprises a micro display 15 and imaging optics 17 including a collimating lens 20. The light engine also includes a processor which is capable of generating an image for the micro display. The micro display can be any type of image source, such as liquid crystal on silicon (LCOS) displays transmissive liquid crystal displays (LCD), matrix arrays of LED's (whether organic or inorganic) or any other suitable display. The display is driven by circuitry which is not visible in FIG. 2A which activates individual pixels of the display to generate an image. The substantially collimated light, from each pixel, falls on an exit pupil 22 of the light engine 13. At exit pupil 22, collimated light beams are coupled into each optical component, 10L, 10R into a respective in-coupling zone 12L, 12R provided on each component. These in-coupling zones are clearly shown in FIG. 1, but are not readily visible in FIG. 2A. In-coupled light is then guided, through a mechanism that involves diffraction and TIR, laterally of the optical component in a respective intermediate (fold) zone 14L, 14R, and also downward into a respective exit zone 16L, 16R where it exits the component 10 towards the users' eye. The zones 14L, 14R, 16L and 16R are shown in FIG. 1. These mechanisms are described in detail below. FIG. 2A shows a user's eye (right or left) receiving the diffracted light from an exit zone (16L or 16R). The output beam OB to a user's eye is parallel with the incident beam IB. See, for example, the beam marked IB in FIG. 2A and two of the parallel output beams marked OB in FIG. 2A. The optical component 10 is located between the light engine 13 and the eye i.e. the display system configuration is of so-called transmissive type.

The optical component 10 is substantially transparent such that a user can not only view the image from the light engine 13, but also can view a real world view through the optical component 10.

The optical component 10 has a refractive index n which is such that total internal reflection takes place guiding the beam from the in-coupling zone 12 along the intermediate expansion zone 14, and down towards the exit zone 16.

Figure 2B:
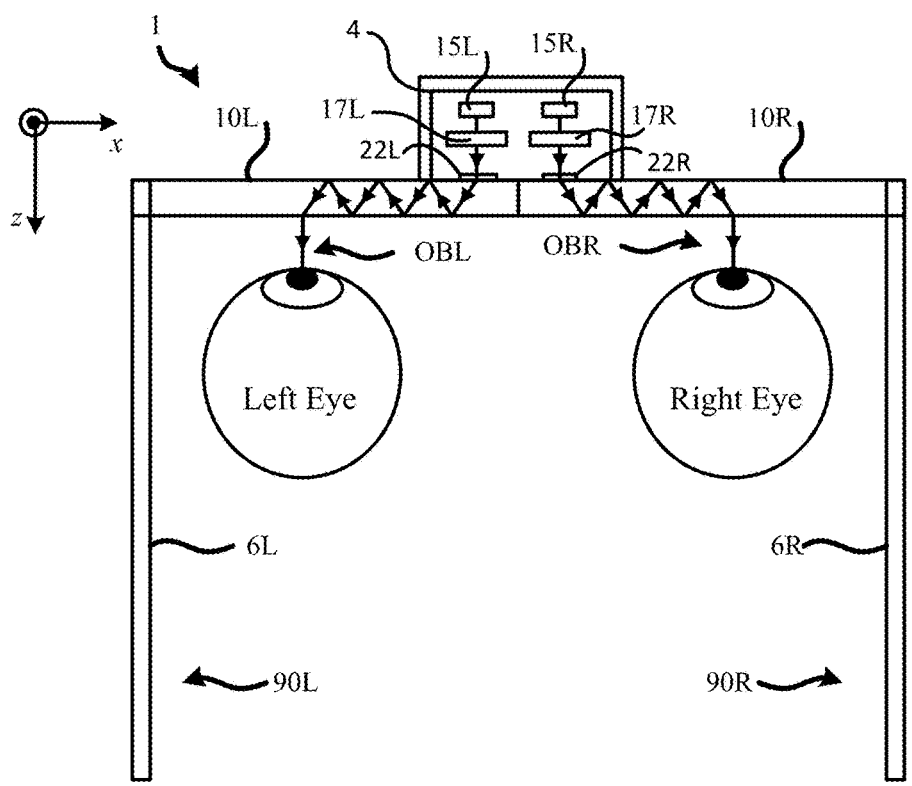
FIG. 2B shows a plan view of the display system.

FIG. 2B shows a plan view of the display system 1. Separate left and right displays (15L, 15R), each with their own imaging optics (17L, 17R) are housed in the central portion (4). These constitute separate light engines 13L, 13R of the kind just described. Beams created by the left imaging optics (17L, respective right imaging optics 17R) from a left image on the left display (15L, respective right image on the right display 15R) are coupled into the left optical component (10L, respective right optical component 10R). The beams of the left image (respective right image) are guided though the left component (10L, respective right component 10R) and onto the user's left (respective right eye). The guiding mechanism is described in more detail below (note that description pertaining the display/collimating optics 15/17 applies equally to both the left display/optics 15L/17L and to the right display 15R/17R). The left and right images may be different to one another in a manner such that a stereoscopic image is perceived by the wearer, i.e. to create an illusion of depth. The left display (15L) and associated collimating optics (17L) (respective right display 15R and associated collimating optics 17R) constitute a set of left imaging components (respective right imaging components).

The wearer's ears are not shown in FIG. 2B, however as will be apparent, parts (90L, 90R) of the left and right extensions (6L, 6R) fit over and are supported by the wearer's left and right ears respectively so that the optical components (10L, 10R) are supported forward of the user's left and right eyes respectively in the manner of conventional spectacle lenses, with the central portion (4) fitting over the nose bridge of the wearer.

Other headpieces are also within the scope of the subject matter. For instance, the display optics can equally be attached to the users head using a head band, helmet or other fit system. The purpose of the fit system is to support the display and provide stability to the display and other head borne systems such as tracking systems and cameras. The fit system will also be designed to meet user population in anthropometric range and head morphology and provide comfortable support of the display system. The light engines 17L, 17R may be mounted to a central portion of any such headpiece so that they sit centrally relative to the user when the headpiece is worn, and not at the user's temples.

Known types of head-mounted display systems tend to locate imaging components to the side of the frame so that they sit near to the user's temple. This is thought to improve the wearability of the device as this is generally seen to be the least obtrusive location.

However, the inventors have recognized that, for a stereoscopic imaging system, misalignment of a stereoscopic image pair can occur with even slight changes in the relative position of the left and right optical imaging components. Such changes can arise from transient deflection of the frame through normal use as a result of mechanical or thermal effects, long term deflection though wear and tear, or other reasons causing misalignment. Even slight changes can introduce a level of binocular disparity between the left and right images to which the human visual system (HVS) is highly sensitive, to the extent that even relatively short-term exposure to even a small level of binocular disparity can make the wearer feel quite unwell. The HVS is particular sensitive to vertical disparity between the left and right images, and even a misalignment of the images by an amount corresponding to as little one pixel can be perceptible depending on the display resolution.

The inventors have recognized that in systems, where the left and right imaging components are located far away from each other, on the sides of the frames, maintaining this level of angular alignment between the left and right components would be impracticable. One way this could be achieved in theory is to make the portion of the frame between the left and right components sufficiently rigid. However, in practice it is unlikely that the necessary tolerances to maintain binocular parity could be held, and in any event including any such structure in the system would significantly increase manufacturing costs.

The inventors have recognized that were the left and right imaging components to be located to the left and right of the display system maintaining this level of angular alignment between the left and right components would be impracticable. One way this could be achieved, in theory, is to make the portion of the frame between the left and right components sufficiently rigid. However, in practice it is unlikely that the necessary tolerances to maintain binocular parity could be held, and in any event including any such structure in the system would significantly increase manufacturing costs.

In the display system disclosed herein, the left and right displays are housed adjacent one another in the central portion (4) of the frame (6). The central portion (4) forms a housing, which houses both of the displays (15L, 15R) as well as their respective associated collimating optics (17L, 17R).

Collocating both the left and right imaging component (15L/17L, 15R/17R) in this manner ensures that any thermal disturbances affect both the first and second images equally and in the same manner (which is acceptable as binocular disparity only results if they are perturbed differently to one another). Thus, collocating the left and right components (15L/17L, 15R/17R) substantially eliminates any binocular disparity which would otherwise occur due to thermal fluctuations, with the centrality of the location ensuring each is able to cooperate as intended with the respective optical component (10L, 10R).

Collocating the imaging components (15L/17L, 15R/17R) also means that mechanical perturbations are less likely to introduce disparity, e.g. twisting or bending of the frame (6) is less likely to introduce disparity when these components are centrally located as compared with locating them at the sides of the frame.

Although not shown explicitly in FIG. 2B, the imaging component (15L/17L, 15R/17R) are supported in the central portion (4) in a rigid formation by a rigid support structure, for example a carbon fibre support structure, which is significantly more rigid than the frame (6). Carbon fibre is just an example and other low mass rigid materials could be used, e.g. titanium. Supporting both the left and right imaging component in the same highly rigid structure maintains a precise relative alignment between the left imaging components (15L/17L) and the right imaging components (15R/17R) even in the presence of significant mechanical perturbations. Even if the imaging components move relative to the frame (6) and in particular relative to the optical components (10L, 10R), binocular parity is maintained because rigidity of the support structure keeps the imaging components (15L/17L) and (15R/17R) in a substantially fixed arrangement relative to one another.

Because the left and right imaging components (15L/17L) and (15R/17R) are all located near to one another, the rigid support structure can be small in size, i.e. requiring a significantly smaller amount of rigid material that if the left and right imaging components were to be located at the sides of the frame instead. This significantly reduces the cost of manufacturing the display system.

Figure 3A:
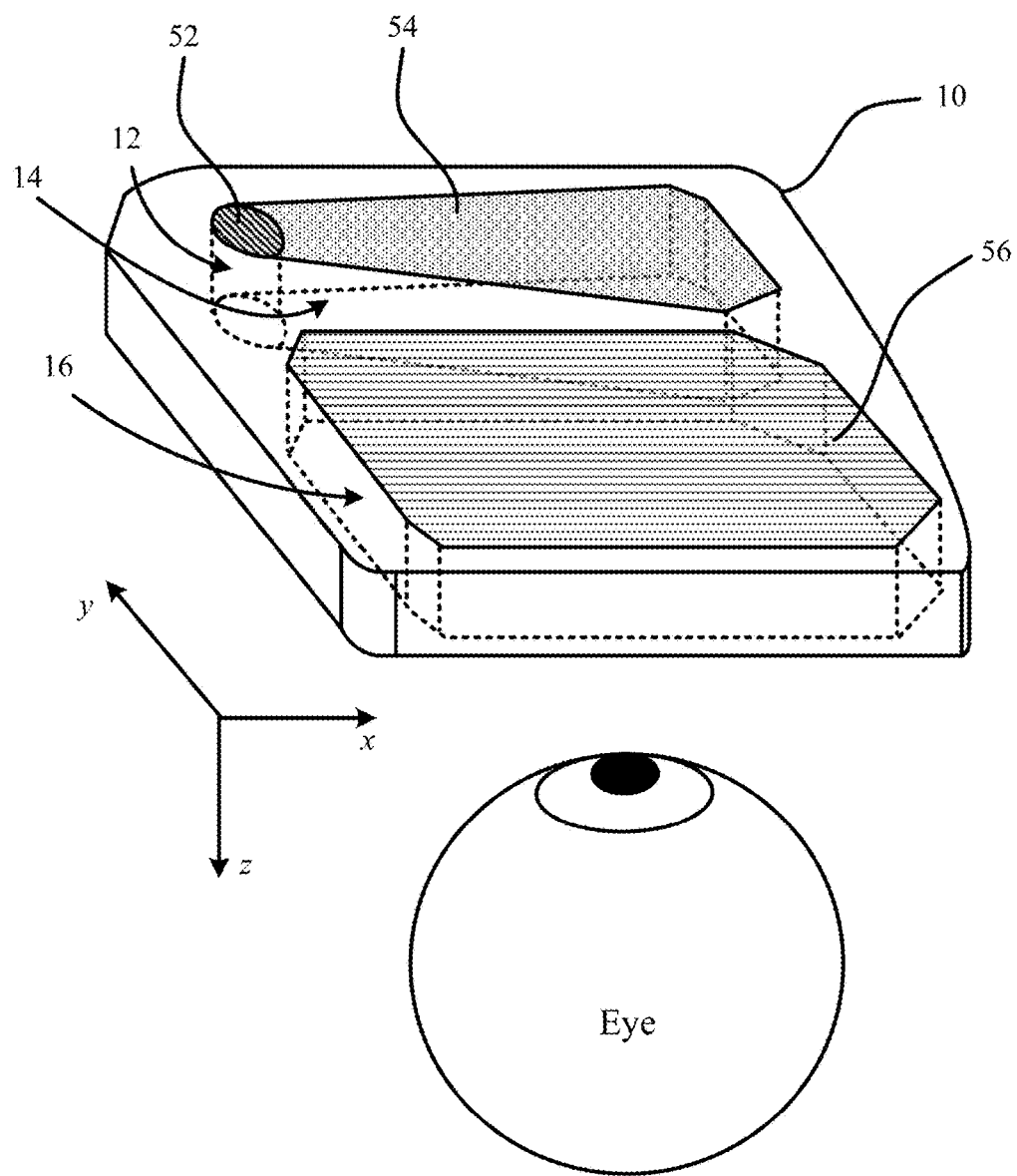
FIGS. 3A and 3B shows perspective and frontal view of an optical component.
Figure 3B:
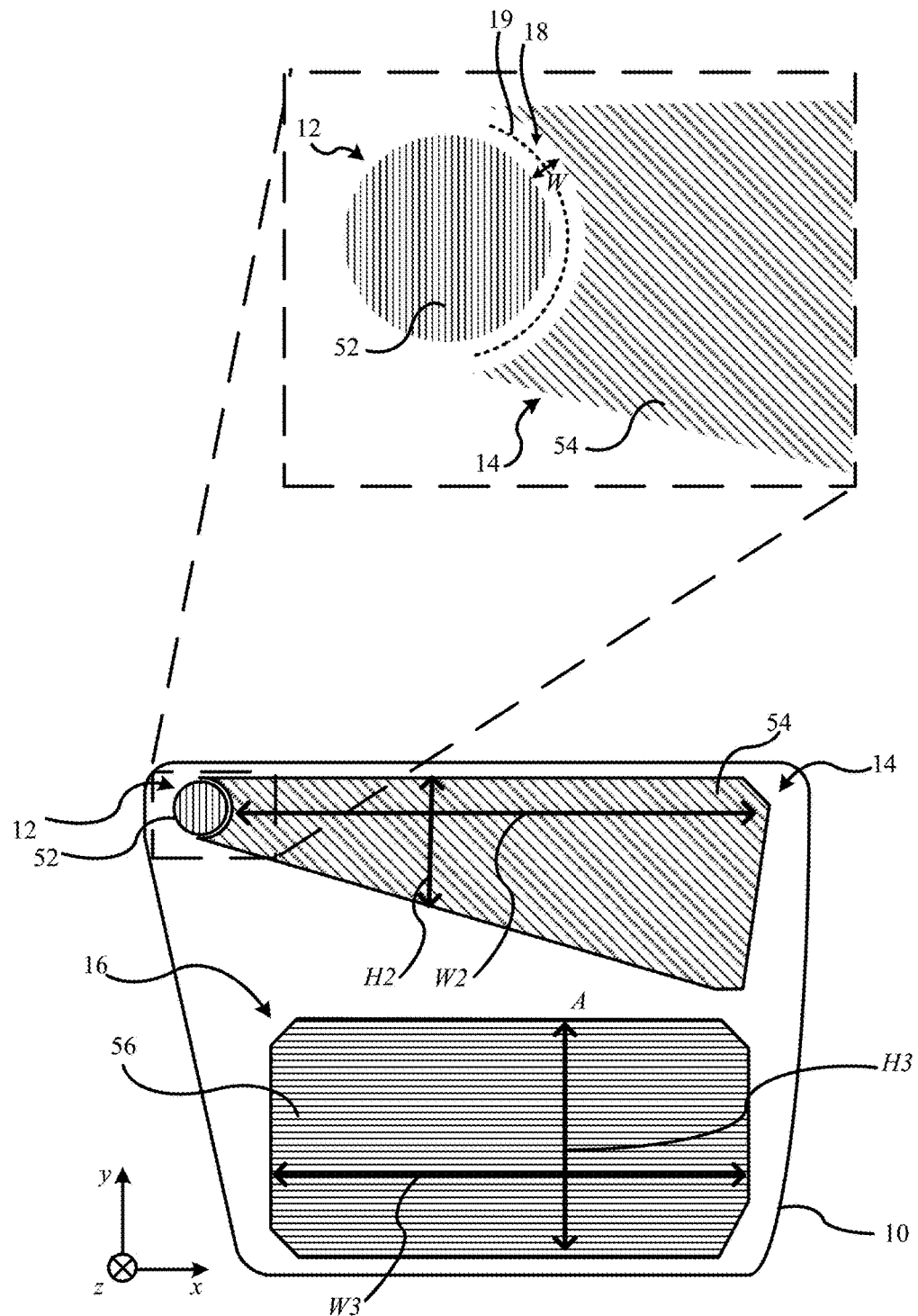

FIGS. 3A and 3B show an optical component in more detail.

FIG. 3A shows a perspective view of a waveguide optical component (10). The optical component is flat in that the front and rear portions of its surface are substantially flat (front and rear defined from the viewpoint of the wearer, as indicated by the location of the eye in FIG. 3A). The front and rear portions of the surface are parallel to one another. The optical component (10) lies substantially in a plane (xy-plane), with the z axis (referred to as the "normal") directed towards the viewer from the optical component (10). The incoupling, fold and exit zones (12, 14 and 16) are shown, each defined by respective surface modulations (52, 46 and 56) on the surface of the optical component, which are on the rear of the waveguide from a viewpoint of the wearer. Each of the surface modulations (52, 46, 56) forms a respective surface relief grating (SRG), the nature of which will be described shortly. Instead of the SRGs, holograms could be used providing the same optical function as the SRGs.

As shown in the plan view of FIG. 3B, the fold zone has a horizontal extent (W2) (referred to herein as the "width" of the expansion zone) in the lateral (x) direction and an extent (H2) in the vertical (y) direction (referred to herein as the "height" of the expansion zone) which increases from the inner edge of the optical component to its outer edge in the lateral direction along its width (W2). The exit zone has a horizontal extent (W3) (width of the exit zone) and y-direction extent (H3) (height of the exit zone) which define the size of the eye box. The eyebox's size is independent of the imaging optics in the light engine. The incoupling and fold SRGs (52, 54) have a relative orientation angle A, as do the fold and exit SRGs (54, 56) (note the various dotted lines superimposed on the SRGs 52, 54, 56 in FIG. 9B described below denote directions perpendicular to the grating lines of those SRGs).

The incoupling and fold zones (12, 14) are substantially contiguous in that they are separated by at most a narrow border zone (18) which has a width (W) as measured along (that is, perpendicular to) a common border (19) that divides the border zone (18). The common border (19) is arcuate (substantially semi-circular in this example), the incoupling and fold regions (12, 14) having edges which are arcuate (substantially semi-circular) along the common border (19). The edge of the incoupling region (12) is substantially circular overall.

Principles of the diffraction mechanisms which underlie operation of the head mounted display described herein will now be described with reference to FIGS. 4A and 4B.

The optical components described herein interact with light by way of reflection, refraction and diffraction. Diffraction occurs when a propagating wave interacts with a structure, such as an obstacle or slit. Diffraction can be described as the interference of waves and is most pronounced when that structure is comparable in size to the wavelength of the wave. Optical diffraction of visible light is due to the wave nature of light and can be described as the interference of light waves. Visible light has wavelengths between approximately 390 and 700 nanometers (nm) and diffraction of visible light is most pronounced when propagating light encounters structures of a similar scale e.g. of order 100 or 1000 nm in scale.

One example of a diffractive structure is a periodic (substantially repeating) diffractive structure. Herein, a "diffraction grating" means any (part of) an optical component which has a periodic diffractive structure. Periodic structures can cause diffraction of light, which is typically most pronounced when the periodic structure has a spatial period of similar size to the wavelength of the light. Types of periodic structures include, for instance, surface modulations on the surface of an optical component, refractive index modulations, holograms etc. When propagating light encounters the periodic structure, diffraction causes the light to be split into multiple beams in different directions. These directions depend on the wavelength of the light thus diffractions gratings cause dispersion of polychromatic (e.g. white) light, whereby the polychromatic light is split into different coloured beams travelling in different directions.

When the periodic structure is on the surface of an optical component, it is referred to a surface grating. When the periodic structure is due to modulation of the surface itself, it is referred to as a surface relief grating (SRG). An example of a SRG is uniform straight grooves in a surface of an optical component that are separated by uniform straight groove spacing regions. Groove spacing regions are referred to herein as "lines", "grating lines" and "filling regions". The nature of the diffraction by a SRG depends both on the wavelength of light incident on the grating and various optical characteristics of the SRG, such as line spacing, groove depth and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mould for manufacturing further optical components.

An SRG is an example of a Diffractive Optical Element (DOE). When a DOE is present on a surface (e.g. when the DOE is an SRG), the portion of that surface spanned by that DOE is referred to as a DOE area.

Figure 4A:
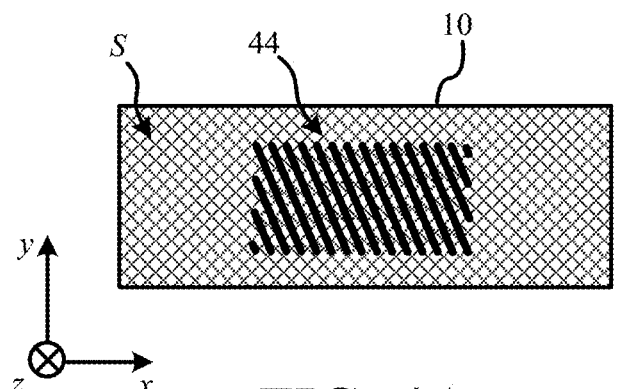
FIG. 4A shows a schematic plan view of an optical component having a surface relief grating formed on its surface.
Figure 4B:
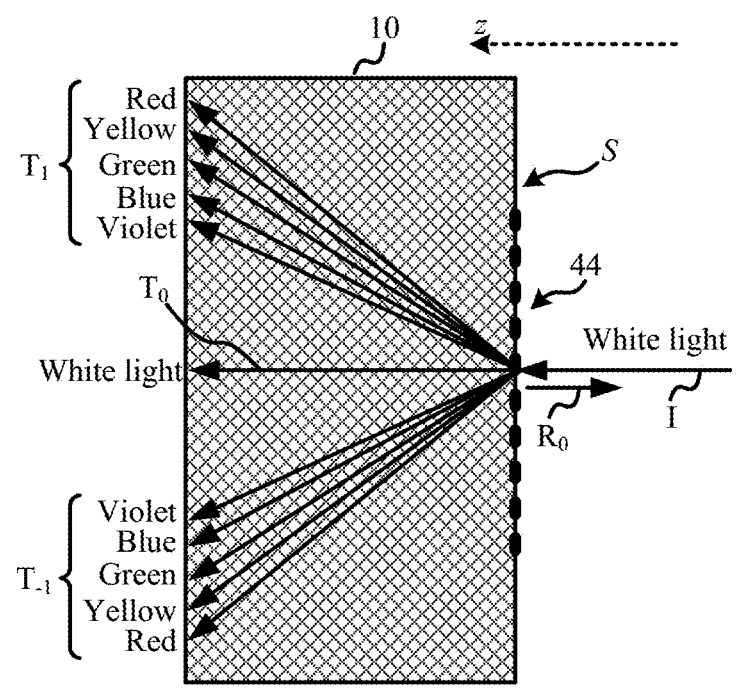
FIG. 4B shows a schematic illustration of the optical component of FIG. 4A, shown interacting with incident light and viewed from the side.

FIGS. 4A and 4B show from the top and the side respectively part of a substantially transparent optical component (10) having an outer surface (S). At least a portion of the surface S exhibits surface modulations that constitute a SRG (44) (e.g. 52, 54, 56), which is a microstructure. Such a portion is referred to as a "grating area". The modulations comprise grating lines which are substantially parallel and elongate (substantially longer than they are wide), and also substantially straight in this example (though they need not be straight in general).

FIG. 4B shows the optical component (10), and in particular the SRG (44), interacting with an incoming illuminating light beam I that is inwardly incident on the SRG (44). The incident light (I) is white light in this example, and thus has multiple colour components. The light (I) interacts with the SRG (44) which splits the light into several beams directed inwardly into the optical component (10). Some of the light (I) may also be reflected back from the surface (S) as a reflected beam (R0). A zero-order mode inward beam (T0) and any reflection (R0) are created in accordance with the normal principles of diffraction as well as other non-zero-order (±n-order) modes (which can be explained as wave interference). FIG. 4B shows first-order inward beams (T1, T-1); it will be appreciated that higher-order beams may or may not also be created depending on the configuration of the optical component (10). Because the nature of the diffraction is dependent on wavelength, for higher-order modes, different colour components (i.e. wavelength components) of the incident light (I) are, when present, split into beams of different colours at different angles of propagation relative to one another as illustrated in FIG. 4B.

Figure 5A:
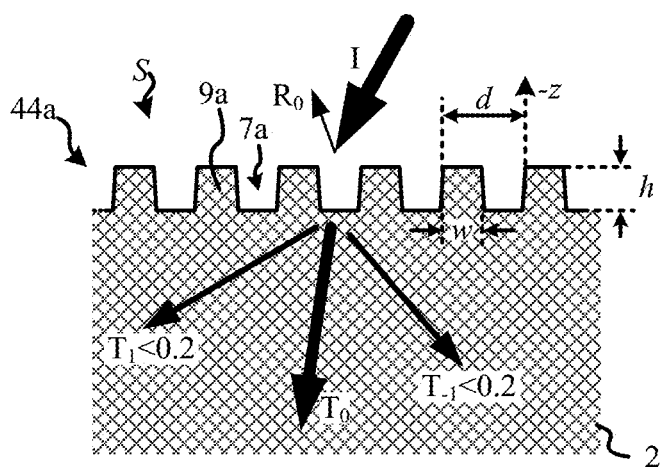
FIG. 5A shows a schematic illustration of a straight binary surface relief grating, shown interacting with incident light and viewed from the side.
Figure 5B:
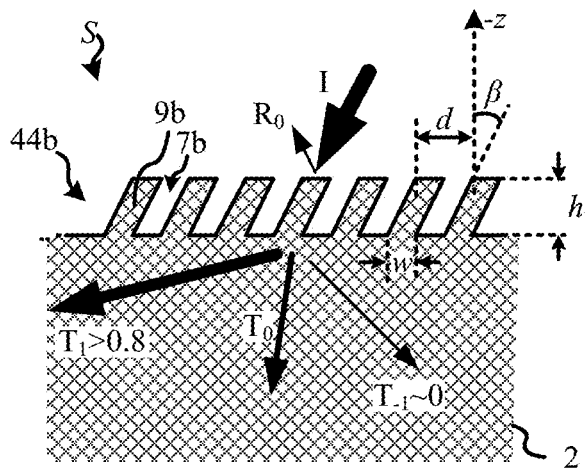
FIG. 5B shows a schematic illustration of a slanted binary surface relief grating, shown interacting with incident light and viewed from the side.
Figure 5C:
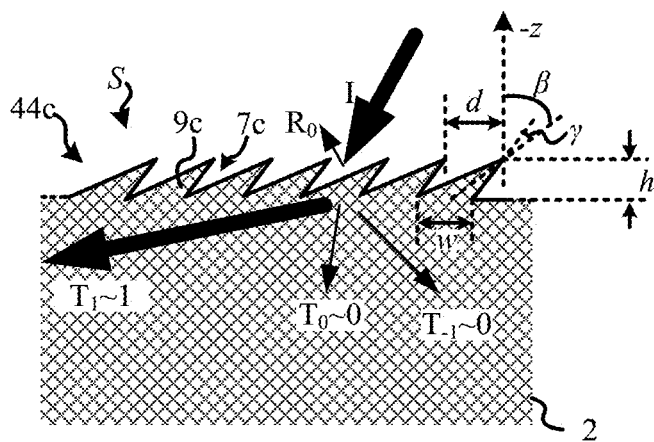
FIG. 5C shows a schematic illustration of an overhanging triangular surface relief grating, shown interacting with incident light and viewed from the side.

FIGS. 5A-5C are close-up schematic cross sectional views of different exemplary SRGs 44a-44c (collectively referenced as 44 herein) that may be formed by modulation of the surface S of the optical component 10 (which is viewed from the side in these figures). Light beams are denoted as arrows whose thicknesses denote approximate relative intensity (with higher intensity beams shown as thicker arrows).

FIG. 5A shows an example of a straight binary SRG (44a). The straight binary SRG (44a) is formed of a series of grooves (7a) in the surface (S) separated by protruding groove spacing regions (9a) which are also referred to herein as "filling regions", "grating lines" or simply "lines". The SRG (44a) has a spatial period of d (referred to as the "grating period"), which is the distance over which the modulations' shape repeats and which is thus the distance between adjacent lines/grooves. The grooves (7a) have a depth (h) and have substantially straight walls and substantially flat bases. The filling regions have a height (h) and a width that is substantially uniform over the height (h) of the filling regions, labelled "w" in FIG. 5A (with w being some fraction f of the period: w=f*d).

For a straight binary SRG, the walls are substantially perpendicular to the surface (S). For this reason, the SRG (44a) causes symmetric diffraction of incident light (I) that is entering perpendicularly to the surface, in that each +n-order mode beam (e.g. T1) created by the SRG (4a) has substantially the same intensity as the corresponding -n-order mode beam (e.g. T-1), typically less than about one fifth (0.2) of the intensity of the incident beam (I).

FIG. 5B shows an example of a slanted binary SRG (44b). The slanted binary SRG (44b) is also formed of grooves, labelled 7b, in the surface (S) having substantially straight walls and substantially flat bases separated by lines (9b) of width (w). However, in contrast to the straight SRG (44a), the walls are slanted by an amount relative to the normal, denoted by the angle β in FIG. 5B. The grooves (7b) have a depth (h) as measured along the normal. Due to the asymmetry introduced by the non-zero slant, ±n-order mode inward beams travelling away from the slant direction have greater intensity that their ∓n-order mode counterparts (e.g. in the example of FIG. 5B, the T1 beam is directed away from the direction of slant and has usually greater intensity than the T-1 beam, though this depends on e.g. the grating period d); by increasing the slant by a sufficient amount, those ∓n counterparts can be substantially eliminated (i.e. to have substantially zero intensity). The intensity of the T0 beam is typically also very much reduced by a slanted binary SRG such that, in the example of FIG. 5B, the first-order beam T1 typically has an intensity of at most about four fifths (0.8) the intensity of the incident beam (I).

The binary SRGs (44a) and (44b) can be viewed as spatial waveforms embedded in the surface (S) that have a substantially square wave shape (with period d). In the case of the SRG (44b), the shape is a skewed square wave shape skewed by β.

FIG. 5C shows an example of an overhanging triangular SRG (44c) which is a special case of an overhanging trapezoidal SRG. The triangular SRG (44c) is formed of grooves (7c) in the surface (S) that are triangular in shape (and which thus have discernible tips) and which have a depth (h) as measured along the normal. Filling regions (9c) take the form of triangular, tooth-like protrusions (teeth), having medians that make an angle β with the normal (β being the slant angle of the SRG 44c). The teeth have tips that are separated by (d) (which is the grating period of the SRG 44c), a width that is (w) at the base of the teeth and which narrows to substantially zero at the tips of the teeth. For the SRG (44c) of FIG. 5C, w≈d, but generally can be w<d. The SRG is overhanging in that the tips of the teeth extend over the tips of the grooves. It is possible to construct overhanging triangular SRGs that substantially eliminate both the zero order transmission-mode (T0) beam and the ∓n-mode beams, leaving only ±n-order mode beams (e.g. only T1). The grooves have walls which are at an angle γ to the median (wall angle).

The SRG (44c) can be viewed as a spatial waveform embedded in (S) that has a substantially triangular wave shape, which is skewed by β.

Other SRGs are also possible, for example other types of trapezoidal SRGs (which may not narrow in width all the way to zero), sinusoidal SRGs etc. Such other SRGs also exhibit depth (h), linewidth (w), slant angle β and wall angles γ which can be defined in a similar manner to FIG. 5A-C.

In the present display system, d is typically between about 250 and 500 nm, and h between about 30 and 400 nm. The slant angle β is typically between about 0 and 45 degrees (such that slant direction is typically elevated above the surface (S) by an amount between about 45 and 90 degrees).

An SRG has a diffraction efficiency defined in terms of the intensity of desired diffracted beam(s) (e.g. T1) relative to the intensity of the illuminating beam (I), and can be expressed as a ratio (η) of those intensities. As will be apparent from the above, slanted binary SRGs can achieve higher efficiency (e.g. 4b—up to η≈0.8 if T1 is the desired beam) than non-slanted SRGs (e.g. 44a—only up to about η≈0.2 if T1 is the desired beam). With overhanging triangular SRGs, it is possible to achieve near-optimal efficiencies of η≈1.

Returning to FIGS. 3A and 3B, it can be seen that the incoupling, fold and exit zones (12, 14, 16) are diffraction gratings whose periodic structure arises due to the modulations (52, 54, 56) of the optical component's surface that form the incoupling, fold and exit SRGs respectively, and which cover the incoupling, fold and exit zones 12, 14, 16 respectively.

Figure 6:
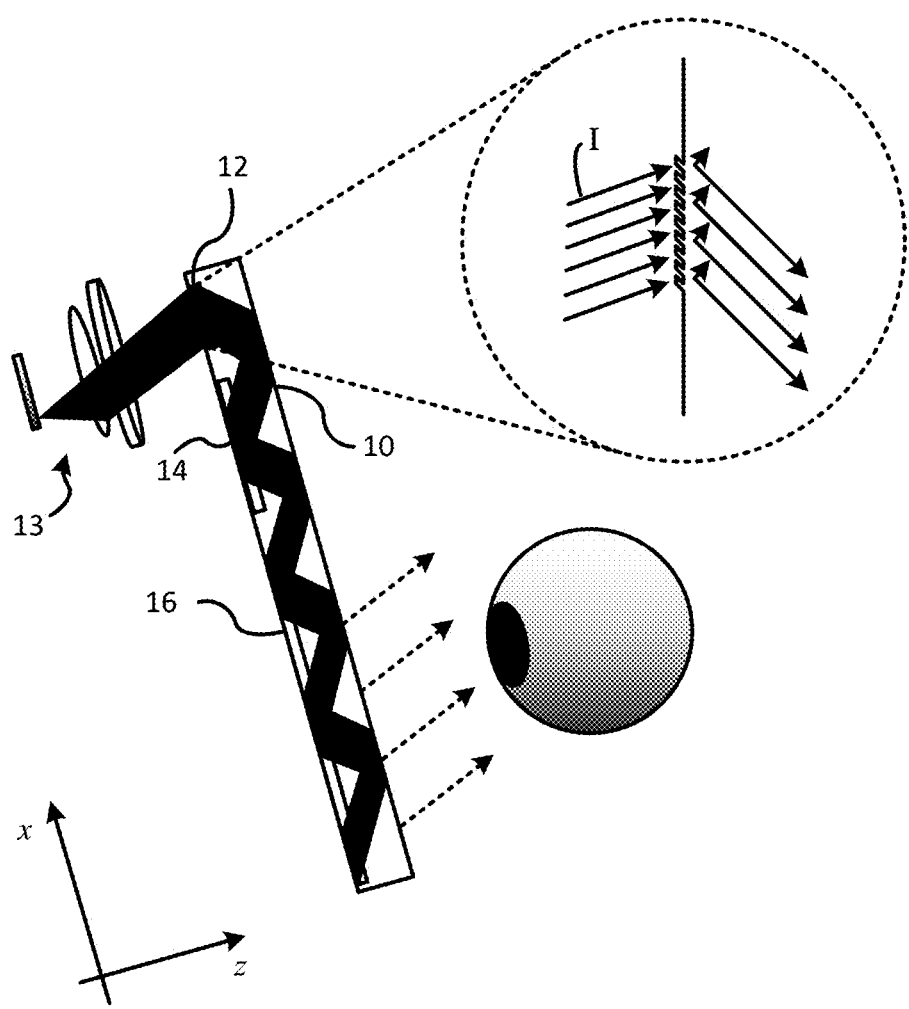
FIG. 6 shows a close up view of part of an incoupling zone of an optical component.

FIG. 6 shows the incoupling SRG (52) with greater clarity, including an expanded version showing how the light beam interacts with it. FIG. 6 shows a plan view of the optical component (10). The light engine (13) provides beams of collimated light, one of which is shown (corresponding to a display pixel). That beam falls on the incoupling SRG (52) and thus causes total internal reflection of the beam in the component (10). The intermediate grating (14) directs versions of the beams down to the exit grating (16), which causes diffraction of the image onto the user's eye. The operation of the grating (12) is shown in more detail in the expanded portion which shows rays of the incoming light beam coming in from the left and denoted (I) and those rays being diffracted so as to undergo TIR in the optical component (10). The grating in FIG. 6 is of the type shown in FIG. 5B but could also be of the type shown in FIG. 5C or some other slanted grating shape.

Optical principles underlying certain embodiments will now be described with reference to FIGS. 7A-9B.

Collimating optics of the display system are arranged to substantially collimate an image on a display of the display system into multiple input beams. Each beam is formed by collimating light from a respective image point, that beam directed to the incoupling zone in a unique inward direction which depends on the location of that point in the image. The multiple input beams thus form a virtual version of the image. The intermediate and exit zones have widths substantially larger than the beams' diameters. The incoupling zone is arranged to couple each beam into the intermediate zone, in which that beam is guided onto multiple splitting regions of the intermediate zone in a direction along the width of the intermediate zone. The intermediate zone is arranged to split that beam at the splitting regions to provide multiple substantially parallel versions of that beam. Those multiple versions are coupled into the exit zone, in which the multiple versions are guided onto multiple exit regions of the exit zone. The exit regions lie in a direction along the width of the exit zone. The exit zone is arranged to diffract the multiple versions of that beam outwardly, substantially in parallel and in an outward direction which substantially matches the unique inward direction in which that beam was incoupled. The multiple input beams thus cause multiple exit beams to exit the waveguide which form substantially the same virtual version of the image.

FIG. 7a shows a perspective view of the display (15), imaging optics (17) and incoupling SRG (52). Different geometric points on the region of the display (15) on which an image is displayed are referred to herein as image points, which may be active (currently emitting light) or inactive (not currently emitting light). In practice, individual pixels can be approximated as image points.

The imaging optics (17) can typically be approximated as a principal plane (thin lens approximation) or, in some cases, more accurately as a pair of principal planes (thick lens approximation) the location(s) of which are determined by the nature and arrangement of its constituent lenses. In these approximations, any refraction caused by the imaging optics (17) is approximated as occurring at the principal plane(s). To avoid unnecessary complication, principles of various embodiments will be described in relation to a thin lens approximation of the imaging optics (17), and thus in relation to a single principal plane labelled 31 in FIG. 7a, but it will be apparent that more complex imaging optics that do not fit this approximation still can be utilized to achieve the desired effects.

The imaging optics (17) has an optical axis (30) and a front focal point, and is positioned relative to the optical component (10) so that the optical axis (30) intersects the incoupling SRG (52) at or near the geometric centre of the incoupling SRG (52) with the front focal point lying substantially at an image point $X_0$ on the display (that is, lying in the same plane as the front of the display). Another arbitrary image point X on the display is shown, and principles underlying various embodiments will now be described in relation to X without loss of generality. In the following, the terminology "for each X" or similar is used as a convenient shorthand to mean "for each image point (including X)" or similar, as will be apparent in context.

When active, image points—including the image point labelled X and $X_0$—act as individual illumination point sources from which light propagates in a substantially isotropic manner through the half-space forward of the display (15). Image points in areas of the image perceived as lighter emit light of higher intensity relative to areas of the image perceived as darker. Image points in areas perceived as black emit no or only very low intensity light (inactive image points). The intensity of the light emitted by a particular image point may change as the image changes, for instance when a video is displayed on the display (15).

Each active image point provides substantially uniform illumination of a collimating area (A) of the imaging optics (17), which is substantially circular and has a diameter (D) that depends on factors such as the diameters of the constituent lenses (typically D is of order 1-10 mm) This is illustrated for the image point X in FIG. 7a, which shows how any propagating light within a cone 32(X) from X is incident on the collimating area A. The imaging optics collimates any light 32(X) incident on the collimating area A to form a collimated beam 34(X) of diameter D (input beam), which is directed towards the incoupling grating (52) of the optical component (10). The beam 34(X) is thus incident on the incoupling grating (52). A shielding component (not shown) may be arranged to prevent any uncollimated light from outside of the cone 32(X) that is emitted from X from reaching the optical component (10).

The beam 34(X) corresponding to the image point X is directed in an inward propagation direction towards the incoupling SRG (52), which can be described by a propagation vector $\hat{k}_{in}(X)$ (herein, bold typeface is used to denote 3-dimensional vectors, with hats on such vectors indicating denoting a unit vector). The inward propagation direction depends on the location of X in the image and, moreover, is unique to X. That unique propagation direction can be parameterized in terms of an azimuthal angle $\varphi_{in}(X)$ (which is the angle between the x-axis and the projection of $\hat{k}_{in}(X)$ in the xy-plane) and a polar angle $\theta_{in}(X)$ (which is the angle between the z-axis and $\hat{k}_{in}(P)$ as measured in the plane in which both the z-axis and $\hat{k}_{in}(x)$ lie—note this is not the xz-plane in general). The notation $\varphi_{in}(X)$, $\theta_{in}(X)$ is adopted to denote the aforementioned dependence on X; as indicated $\varphi_{in}(X)$, $\theta_{in}(X)$ are unique to that X. Note that, herein, both such unit vectors and such polar/azimuthal angle pairs parameterizing such vectors are sometimes referred herein to as "directions" (as the latter represent complete parameterizations thereof), and that sometimes azimuthal angles are referred to in isolation as xy-directions for the same reason. Note further that "inward" is used herein to refer to propagation that is towards the waveguide (having a positive z-component when propagation is towards the rear of the waveguide as perceived by the viewer and a negative z-component when propagation is towards the front of the waveguide).

The imaging optics has a principle point P, which is the point at which the optical axis (30) intersects the principal plane (31) and which typically lies at or near the centre of the collimation area (A). The inward direction $\hat{k}_{in}(x)$ and the optical axis 30 have an angular separation $\beta(X)$ equal to the angle subtended by X and $X_0$ from P. $\beta(X)=\theta_{in}(X)$ if the optical axis is parallel to the z-axis (which is not necessarily the case).

As will be apparent, the above applies for each active image point and the imaging optics is thus arranged to substantially collimate the image, which is currently on the display (15), into multiple input beams, each corresponding to and propagating in a unique direction determined by the location of a respective active image point (active pixel in practice). That is, the imaging optics (17) effectively converts each active point source (X) into a collimated beam in a unique inward direction $\hat{k}_{in}(X)$. As will be apparent, this can be equivalently stated as the various input beams for all the active image points forming a virtual image at infinity that corresponds to the real image that is currently on the display (17). A virtual image of this nature is sometimes referred to herein as a virtual version of the image (or similar).

The input beam corresponding to the image point $X_0$ (not shown) would propagate parallel to the optical axis (30), towards or near the geometric centre of the incoupling SRG (52).

As mentioned, in practice, individual pixels of the display (15) can be approximated as single image points. This is illustrated in FIG. 7B which is a schematic plan view showing the principal plane (31) and two adjacent pixels (Xa, Xb) of the display (15), whose centres subtend an angle $\Delta\beta$ from the principal point P. Light emitted the pixels (Xa, Xb) when active is effectively converted into collimated beams 34(Xa), 34(Xb) having an angular separation equal to $\Delta\beta$. As will be apparent, the scale of the pixels (Xa, Xb) has been greatly enlarged for the purposes of illustration.

The beams are highly collimated, having an angular range no greater than the angle subtended by an individual pixel from P ($\sim\Delta\beta$), e.g. typically having an angular range no more than about ½ milliradian. As will become apparent in view of the following, this increases the image quality of the final image as perceived by the wearer.

FIGS. 7C and 7D show schematic plan (xz) and frontal (yz) views of part of the optical component respectively. As indicated in these figures, the incoupling grating (52) causes diffraction of the beam 34(X) thereby causing a first (±1) order mode beam to propagate within the optical component (10) in a new direction $\hat{k}(X)$ that is generally towards the fold SRG (54) (i.e. that has a positive x-component). The new direction $\hat{k}(X)$ can be parameterized by azimuthal and polar angles $\varphi(X)$—where $|\leq|\varphi_{in}(X)|$ and $\Gamma(X)$—where $|\theta(X)|\geq|\theta_{in}(X)|$—which are also determined by the location of and unique to the image point X. The grating (52) is configured so that the first order mode is the only significant diffraction mode, with the intensity of this new beam thus substantially matching that of the input beam. As mentioned above, a slanted grating can be used to achieve this desired effect (the beam as directed away from the incoupling SRG (52) would correspond, for instance, to beam T1 as shown in FIG. 4B or 4C). In this manner, the beam 34(X) is coupled into the incoupling zone (12) of the optical component (10) in the new direction $\hat{k}(x)$.

The optical component has a refractive index n and is configured such that the polar angle $\theta(X)$ satisfies total internal reflection criteria given by:

$$\sin\theta(X) > 1/n \text{ for each } X. \qquad (1):$$

As will be apparent, each beam input from the imaging optics (17) thus propagates through the optical component (10) by way of total internal reflection (TIR) in a generally horizontal (+x) direction (offset from the x-axis by $\varphi(X)>\varphi_{in}(X)$). In this manner, the beam 34(X) is coupled from the incoupling zone (12) into the fold zone (14), in which it propagates along the width of the fold zone (14).

FIG. 7E shows a frontal (xy) view of the whole of the optical component (10), from a viewpoint similar to that of the wearer. As explained in more detail below, a combination of diffractive beam splitting and total internal reflection within the optical component (10) results in multiple versions of each input beam 34(X) being outwardly diffracted from the exit SRG along both the length and the width of the exit zone (16) as output beams 38(X) in respective outward directions (that is, away from the optical component 10) that substantially match the respective inward direction $\hat{k}_{in}(X)$ of the corresponding input beam 34(X).

In FIG. 7E, beams external to the optical component (10) are represented using shading and dotted lines are used to represent beams within the optical component 10. Perspective is used to indicate propagation in the z-direction, with widening (resp. narrowing) of the beams in FIG. 7E representing propagation in the positive (resp. negative) z direction; that is towards (resp. away from) the wearer. Thus, diverging dotted lines represent beams within the optical component (10) propagating towards the front wall of the optical component (10); the widest parts represent those beams striking the front wall of the optical component 10, from which they are totally internally reflected back towards the rear wall (on which the various SRGs are formed), which is represented by the dotted lines converging from the widest points to the narrowest points at which they are incident on the rear wall. Regions where the various beams are incident on the fold and exit SRGs are labelled S and E and termed splitting and exit regions respectively for reasons that will become apparent.

As illustrated, the input beam 34(X) is coupled into the waveguide by way of the aforementioned diffraction by the incoupling SRG (52), and propagates along the width of the incoupling zone (12) by way of TIR in the direction φ(X), ±θ(X) (the sign but not the magnitude of the polar angle changing whenever the beam is reflected). As will be apparent, this results in the beam 34(X) eventually striking the fold SRG at the left-most splitting region (S).

When the beam 34(X) is incident at a splitting region (S,) that incident beam 34(X) is effectively split in two by way of diffraction to create a new version of that beam 42(X) (specifically a −1 reflection mode beam) which directed in a specific and generally downwards (γy) direction φ'(X), ±θ'(X) towards the exit zone (16) due to the fold SRG (54) having a particular configuration which will be described in due course, in addition to a zero order reflection mode beam (specular reflection beam), which continues to propagate along the width of the beam in the same direction φ(X), ±θ(X) just as the beam 34(X) would in the absence of the fold SRG (albeit at a reduced intensity). Thus, the beam 34(X) effectively continues to propagate along substantially the whole width of the fold zone (14), striking the fold SRG at various splitting regions (S), with another new version of the beam (in the same specific downward direction φ'(X), ±θ'(X)) created at each splitting region (S). As shown in FIG. 7E, this results in multiple versions of the beam 34(X) being coupled into the exit zone (16), which are horizontally separated so as to collectively span substantially the width of the exit zone (16).

As also shown in FIG. 7E, a new version 42(X) of the beam as created at a splitting region (S) may itself strike the fold SRG during its downward propagation. This will result in a zero order mode being created which continues to propagate generally downwards in the direction φ'(X), ±0'(X) and which can be viewed as continued propagation of that beam, but may also result in a non-zero order mode beam 40(X) (further new version) being created by way of diffraction. However, any such beam 40(X) created by way of such double diffraction at the same SRG will propagate in substantially the same direction 4(X), ±θ(X) along the width of the fold zone (14) as the original beam 34(X) as coupled into the optical component (10) (see below). Thus, notwithstanding the possibility of multiple diffractions by the fold SRG, propagation of the various versions of the beam 34(X) (corresponding to image point X) within the optical component (10) is effectively limited to two xy-directions: the generally horizontal direction (4)(X), ±θ(X)), and the specific and generally downward direction ((φ'(X), ±θ'(X)) that will be discussed shortly.

Propagation within the fold zone (14) is thus highly regular, with all beam versions corresponding to a particular image point X substantially constrained to a lattice like structure in the manner illustrated.

The exit zone (16) is located below the fold zone (14) and thus the downward-propagating versions of the beam 42(X) are coupled into the exit zone (16), in which they are guided onto the various exit regions (E) of the output SRG. The exit SRG (56) is configured so as, when a version of the beam strikes the output SRG, that beam is diffracted to create a first order mode beam directed outwardly from the exit SRG (56) in an outward direction that substantially matches the unique inward direction in which the original beam 34(X) corresponding to image point X was inputted. Because there are multiple versions of the beam propagating downwards that are substantially span the width of the exit zone (16), multiple output beams are generated across the width of the exit zone (16) (as shown in FIG. 7E) to provide effective horizontal beam expansion.

Moreover, the exit SRG (56) is configured so that, in addition to the outwardly diffracted beams 38(X) being created at the various exit regions (E) from an incident beam, a zero order diffraction mode beam continuous to propagate downwards in the same specific direction as that incident beam. This, in turn, strikes the exit SRG at a lower exit zone (16) in the manner illustrated in FIG. 7E, resulting in both continuing zero-order and outward first order beams. Thus, multiple output beams 38(X) are also generated across substantially the width of the exit zone (16) to provide effective vertical beam expansion.

The output beams 38(X) are directed outwardly in outward directions that substantially match the unique input direction in which the original beam 34(X) is inputted.

In this context, substantially matching means that the outward direction is related to the input direction in a manner that enables the wearer's eye to focus any combination of the output beams 38(X) to a single point on the retina, thus reconstructing the image point X (see below).

For a flat optical component (that is, whose front and rear surfaces lie substantially parallel to the xy-plane in their entirety), the output beams are substantially parallel to one another (to at least within the angle Δβ subtended by two adjacent display pixels) and propagate outwardly in an output propagation direction $\hat{k}_{out}(X)$ that is parallel to the unique inward direction $\hat{k}_{in}(X)$ in which the corresponding input beam 34(X) was directed to the incoupling SRG (52). That is, directing the beam 34(X) corresponding to the image point X to the incoupling SRG (52) in the inward direction $\hat{k}_{in}(X)$ causes corresponding output beams 38(X) to be diffracted outwardly and in parallel from the exit zone (16), each in an outward propagation direction $\hat{k}_{out}(X)=\hat{k}_{in}(X)$ due to the configuration of the various SRGs (see below).

As will now be described with reference to FIG. 7F, this enables a viewer's eye to reconstruct the image when looking at the exit zone (16). FIG. 7F shows a plan (xz) view of the optical component 10. The input beam 34(X) is in coupled to the optical component (10) resulting in multiple parallel output beams 38(X) being created at the various exit regions (E) in the manner discussed above. This can be equivalently expressed at the various output beams corresponding to all the image points forming the same virtual image (at infinity) as the corresponding input beams.

Because the beams 38(X) corresponding to the image point X are all substantially parallel, any light of one or more of the beam(s) 38(X) which is received by the eye (37) is focused as if the eye (37) were perceiving an image at infinity (i.e. a distant image). The eye (37) thus focuses such received light onto a single retina point, just as if the light were being received from the imaging optics (17) directly, thus reconstructing the image point X (e.g. pixel) on the retina. As will be apparent, the same is true of each active image point (e.g. pixel) so that the eye (37) reconstructs the whole image that is currently on the display (15).

However, in contrast to receiving the image directly from the optics (17)—from which only a respective single beam 34(X) of diameter D is emitted for each X—the output beams 38(X) are emitted over a significantly wider area i.e. substantially that of the exit zone (16), which is substantially larger than the area of the inputted beam (~$D^2$). It does not matter which (parts) of the beam(s) 38(X) the eye receives as all are focused to the same retina point—e.g., were the eye (37) to be moved horizontally (±x) in FIG. 7F, it is apparent that the image will still be perceived. Thus, no adaptation of the display system is required for, viewers with different pupillary distances beyond making the exit zone (16) wide enough to anticipate a reasonable range of pupillary distances, whilst viewers whose eyes are closer together will generally receive light from the side of the exit zone (16) nearer the incoupling zone (12) as compared with viewers whose eyes are further apart, both will nonetheless perceive the same image. Moreover, as the eye (37) rotates, different parts of the image are brought towards the centre of the viewer's field of vision (as the angle of the beams relative to the optical axis of the eye changes) with the image still remaining visible, thereby allowing the viewer to focus their attention on different parts of the image as desired.

The same relative angular separation $\Delta\beta$ exhibited the input beams corresponding any two adjacent pixels (Xa, Xb) is also exhibited by the corresponding sets of output beams 38(Xa), 38(Xb)—thus adjacent pixels are focused to adjacent retina points by the eye (37). All the various versions of the beam remain highly collimated as they propagate through the optical component (10), preventing significant overlap of pixel images as focused on the retina, thereby preserving image sharpness.

It should be noted that FIGS. 7A-7G are not to scale and that in particular beams diameters are, for the sake of clarity, generally reduced relative to components such as the display (15) than would typically be expected in practice.

The configuration of the incoupling SRG (52) will now be described with reference to FIGS. 8A and 8B, which show schematic plan and frontal views of part of the fold grating (52). Note, in FIGS. 8A and 8B, beams are represented by arrows (that is, their area is not represented) for the sake of clarity.

Figure 8A:
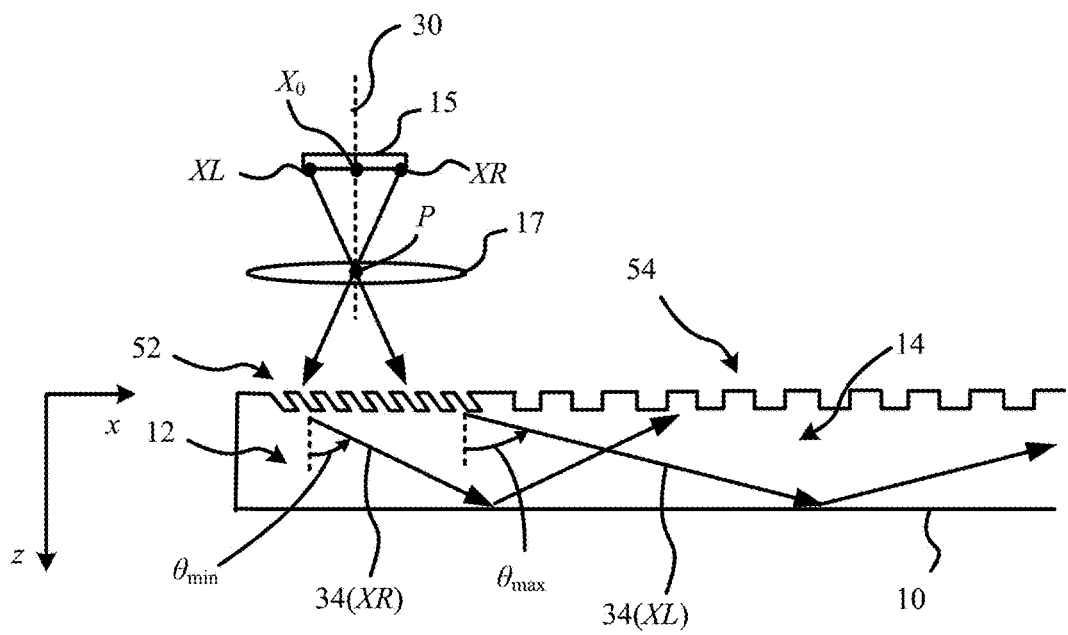
FIGS. 8A and 8B are plan and frontal views of a part of an optical component.

FIG. 8A shows two image points (XL, XR) located at the far left and far right of the display (15) respectively, from which light is collimated by the optics (17) to generate respective input beams 34(XL), 34(XR) in inward directions ($\theta_{in}$(XL), $\varphi_{in}$(XL)), ($\theta_{in}$(XR), $\varphi_{in}$(XR)). These beams are coupled into the optical component (10) by the incoupling SRG (52) as shown—the incoupled beams shown created at the incoupling SRG (52) are first order (+1) mode beams created by way of diffraction of the beams incident on the SRG (52). The beams 34(XL), 34(XR) as coupled into the waveguide propagate in directions defined by the polar angles $\theta$(XL), $\theta$(XR).

Figure 8B:
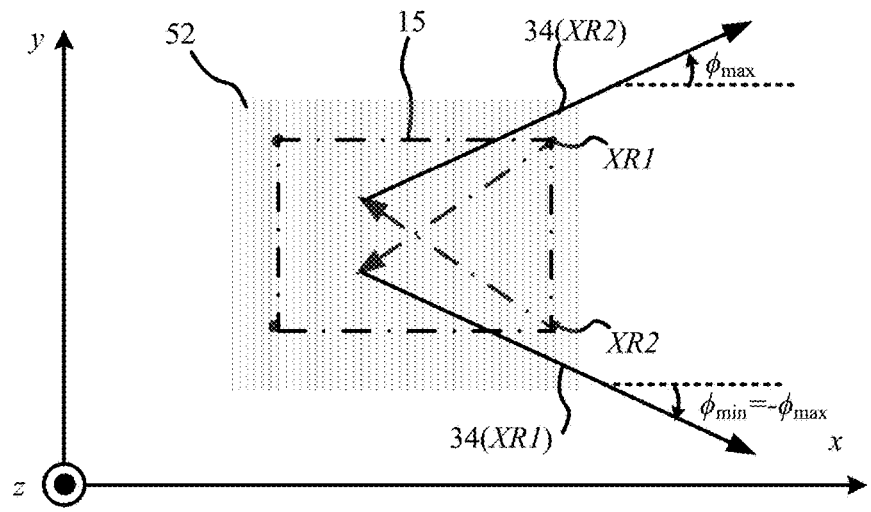

FIG. 8B shows two image points XR1 and XR2 at the far top-right and far bottom-right of the display (15). Note in this figure dashed-dotted lines denote aspects which are behind the optical component (10) (−z). Corresponding beams 34(XL), 34(XR) in directions within the optical component (10) with polar angles $\varphi$(XL), $\varphi$(XR).

Such angles $\theta$(X), $\varphi$(X) are given by the (transmissive) grating equations:

$$n \sin \theta(X) \sin \phi(X) = \sin \theta_{in}(X) \sin \phi_{in}(X) \quad (2)$$

$$n \sin \theta(X) \cos \phi(X) = \sin \theta_{in}(X) \cos \phi_{in}(X) + \frac{\lambda}{d_1} \quad (3)$$

with the SRG (52) having a grating period $d_1$, the beam light having a wavelength $\lambda$, and n the refractive index of the optical component.

It is straightforward to show from equations (2), (3) that $\theta$(XL)=$\theta_{max}$ and $\theta$(XR)=$\theta_{min}$ i.e. that any beam as coupled into the component (10) propagates with an initial polar angle in the range [$\theta$(XR), $\theta$(XL)]; and that $\varphi$(XR2)=$\varphi_{max}$ and $\varphi$(XR1)=$\varphi_{min}$(≈−$\varphi_{max}$ in this example) i.e. that any beam as coupled into the component initially propagates with an azimuthal angle in the range [$\varphi$(XR1), $\varphi$(XR2)] (≈[−$\varphi$(XR2), $\varphi$(XR2)]).

The configuration of the fold SRG (54) will now be described with references to FIGS. 9A-9B. Note, in FIGS. 9A and 9B, beams are again represented by arrows, without any representation of their areas, for the sake of clarity. In these figures, dotted lines denote orientations perpendicular to the fold SRG grating lines, dashed lines orientations perpendicular to the incoupling SRG grating lines, and dash-dotted lines orientations perpendicular to the exit SRG grating lines.

Figure 9A:
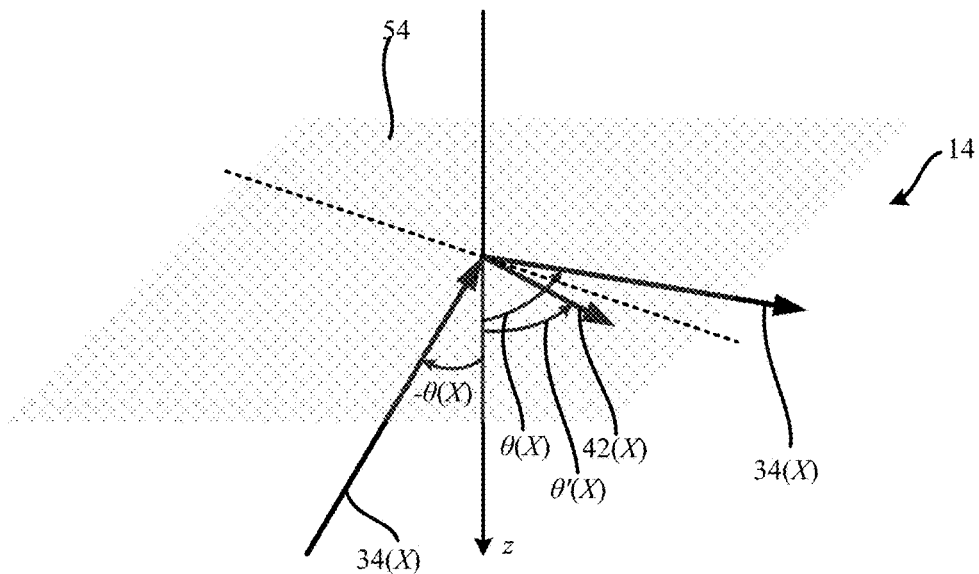
FIG. 9A shows a perspective view of beam reflection within a fold zone of a waveguide.

FIG. 9A shows a perspective view of the beam 34(X) as coupled into the fold zone (14) of the optical component (10), having been reflected from the front wall of the optical component (10) and thus travelling in the direction ($\varphi$(X), −$\theta$(X)) towards the fold SRG (54). A dotted line (which lies perpendicular to the fold SRG grating lines) is shown to represent the orientation of the fold SRG.

The fold SRG (54) and incoupling SRG (52) have a relative orientation angle A (which is the angle between their respective grating lines). The beam thus makes an angle A+$\varphi$(X) (see FIG. 9B) with the fold SRG grating lines as measured in the xy-plane. The beam (34) is incident on the fold SRG (54), which diffracts the beam (34) into different components. A zero order reflection mode (specular reflection) beam is created which continues to propagate in the direction ($\varphi$(X), +$\theta$(X)) just as the beam 34(X) would due to reflection in the absence of the fold SRG (54) (albeit at a reduced intensity). This specular reflection beam can be viewed as effectively a continuation of the beam 34(X) and for this reason is also labelled 34(X). A first order (−1) reflection mode beam 42(X) is also created which can be effectively considered a new version of the beam.

As indicated, the new version of the beam 42(X) propagates in a specific direction ($\varphi'$(X), $\theta'$(X)) which is given by the known (reflective) grating equations:

$$n \sin \theta'(X) \sin(A + \phi'(X)) = n \sin \theta(X) \sin(A + \phi(X)) \quad (4)$$

$$n \sin \theta'(X) \cos(A + \phi'(X)) = n \sin \theta(X) \cos(A + \phi(X)) - \frac{\lambda}{d_2} \quad (5)$$

where the fold SRG has a grating period $d_2$, the beam light has a wavelength $\lambda$ and n is the refractive index of the optical component (10).

Figure 9B:
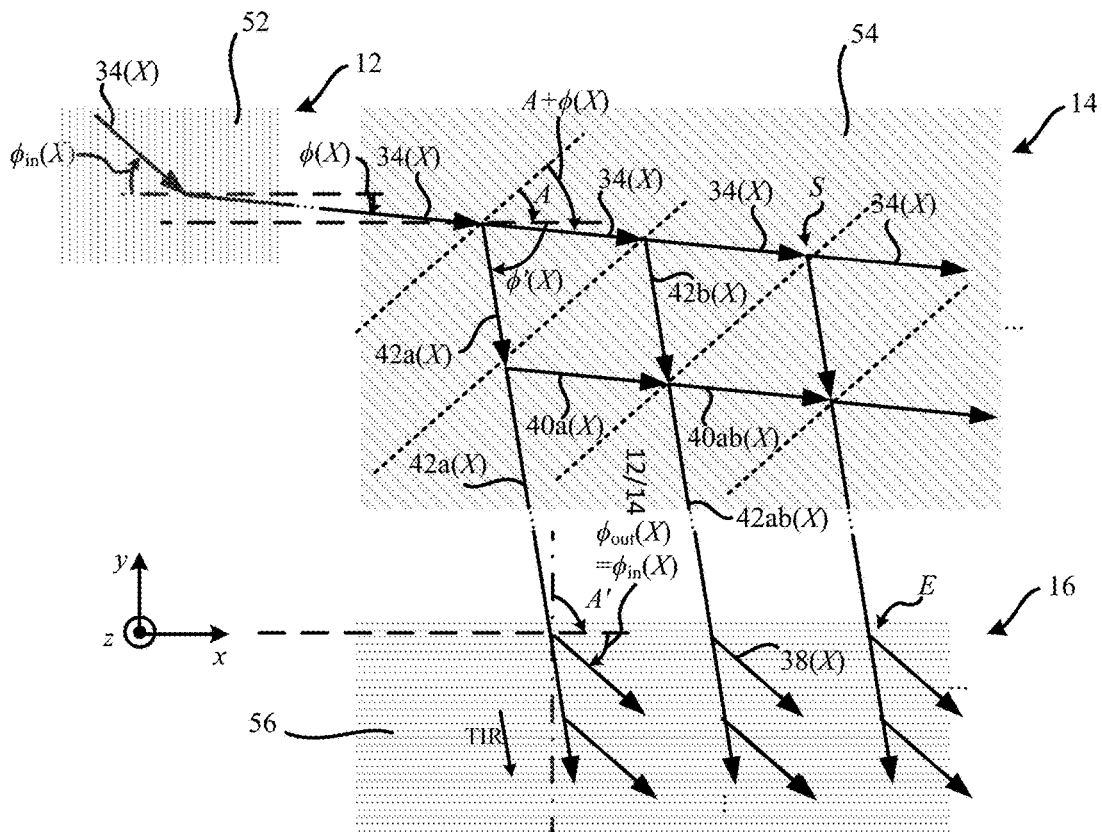
FIG. 9B illustrates a beam expansion mechanism.

As shown in FIG. 9B, which shows a schematic frontal view of the optical component (10), the beam 34(X) is coupled into the incoupling zone (12) with azimuthal angle $\varphi$(X) and thus makes an xy-angle $\varphi$(X)+A the fold SRG 54.

A first new version 42a(X) (−1 mode) of the beam 34(X) is created when it is first diffracted by the fold SRG (54) and a second new version 42b(X) (−1 mode) when it is next diffracted by the fold SRG 54 (and so on), which both propagate in xy-direction $\varphi'$(X). In this manner, the beam 34(X) is effectively split into multiple versions, which are horizontally separated (across the width of the fold zone 14). These are directed down towards the exit zone (16) and thus coupled into the exit zone (16) (across substantially the width of the exit zone 16 due to the horizontal separation).

As can be seen, the multiple versions are thus incident on the various exit regions (labelled E) of the exit SRG (56), which lie along the width of the exit zone (16).

These new, downward (−y)-propagating versions may themselves meet the fold SRG (54) once again, as illustrated. However, it can be shown from equations (4), (5) that any first order reflection mode beam (e.g. 40$a$(X), +1 mode) created by diffraction at an SRG of an incident beam (e.g. 42$a$(X), −1 mode) which is itself a first order reflection mode beam created by an earlier diffraction of an original beam (e.g. 34(X)) at the same SRG will revert to the direction of the original beam (e.g. φ(X), ±θ(X), which is the direction of propagation of 40$a$(X)). Thus, propagation within the fold zone (14) is restricted to a diamond-like lattice, as can be seen from the geometry of FIG. 9B. The beam labelled 42$ab$(X) is a superposition of a specular reflection beam created when 42$b$(X) meets the fold SRG (54) and a −1 mode beam created when 40$a$(X) meets the fold SRG (54) at substantially the same location; the beam labelled 42$ab$(X) is a superposition of a specular reflection beam created when 40$a$(X) meets the fold SRG (54) and a +1 mode beam created when 42$b$(X) meets the fold SRG at substantially the same location (and so on).

The exit SRG and incoupling SRG (52, 56) are oriented with a relative orientation angle A' (which is the angle between their respective grating lines). At each of the exit regions, the version meeting that region is diffracted so that, in addition to a zero order reflection mode beam propagating downwards in the direction φ'(X), ±θ'(X), a first order (+1) transmission mode beam 38(X) which propagates away from the optical component (10) in an outward direction φ$_{out}$(X), θ$_{out}$(X) given by:

$$\sin \theta_{out}(X) \sin(A' + \phi_{out}(X)) = n \sin \theta'(X) \sin(A' + \phi'(X)) \quad (6)$$

$$\sin \theta_{out}(X) \cos(A' + \phi_{out}(X)) = n \sin \theta'(X) \cos(A' + \phi'(X)) + \frac{\lambda}{d_3} \quad (7)$$

The output direction θ$_{out}$(X), φ$_{out}$(X) is that of the output beams outside of the waveguide (propagating in air). For a flat waveguide, equations (6), (7) hold both when the exit grating is on the front of the waveguide—in which case the output beams are first order transmission mode beams (as can be seen, equations (6), (7) correspond to the known transmission grating equations)—but also when the exit grating is on the rear of the waveguide (as in FIG. 7F)—in which case the output beams correspond to first order reflection mode beams which, upon initial reflection from the rear exit grating propagate in a direction θ'$_{out}$(X), φ'$_{out}$(X) within the optical component (10) given by:

$$n \sin \theta'_{out}(X) \sin(A' + \phi'_{out}(X)) = n \sin \theta'(X) \sin(A' + \phi'(X)) \quad (6')$$

$$n \sin \theta'_{out}(X) \cos(A' + \phi'_{out}(X)) = n \sin \theta'(X) \cos(A' + \phi'(X)) + \frac{\lambda}{d_3}; \quad (7')$$

These beams are then refracted at the front surface of the optical component, and thus exit the optical component in a direction θ$_{in}$(X), φ$_{in}$(X) given by Snell's law:

$$\sin \theta_{out}(X) = n \sin \theta'_{out}(X) \quad (8)$$

$$\varphi'_{out}(X) = \varphi_{out}(X) \quad (9)$$

As will be apparent, the conditions of equations (6), (7) follow straight forwardly from equations (6'),(7'),(8) and (9). Note that such refraction at the front surface, whilst not readily visible in FIG. 7F, will nonetheless occur in the arrangement of FIG. 7F.

It can be shown from the equations (2-7) that, when $$d = d_1 = d_3 \quad (10)$$

(that is, when the periods of the incoupling and exit SRGs 52, 56 substantially match);

$$d_2 = d/(2 \cos A); \quad (11)$$

and $$A' = 2A; \quad (12)$$

then (θ$_{out}$(X), φ$_{out}$(X))=(θ$_{in}$(X), φ$_{in}$(X)).
Moreover, when the condition $$\sqrt{(1 + 8 \cos^2 A)} > \frac{nd}{\lambda} \quad (13)$$

is met, no modes besides the above-mentioned first order and zero order reflection modes are created by diffraction at the fold SRG (54). That is, no additional undesired beams are created in the fold zone when this criteria is met. The condition in equation (13) is met for a large range of A, from about 0 to 70 degrees.

In other words, when these criteria are met, the exit SRG (56) effectively acts as an inverse to the incoupling SRG (52), reversing the effect of the incoupling SRG diffraction for each version of the beam with which it interacts, thereby outputting what is effectively a two-dimensionally expanded version of that beam 34(X) having an area substantially that of the exit SRG (56) (>>D²) and which, as noted, is independent of the imaging optics 17) in the same direction as the original beam was inputted to the component (10) so that the outwardly diffracted beams form substantially the same virtual image as the inwardly inputted beams but which is perceivable over a much larger area.

In the example of FIG. 9B, A≈45° i.e. so that the fold SRG and exit SRGs (54, 56) are oriented at substantially 45 and 90 degrees to the incoupling SRG (52) respectively, with the grating period of the fold region $d_2 = d/\sqrt{2}$. However, this is only an example and, in fact, the overall efficiency of the display system is typically increased when A≥50°.

Figure 7G:
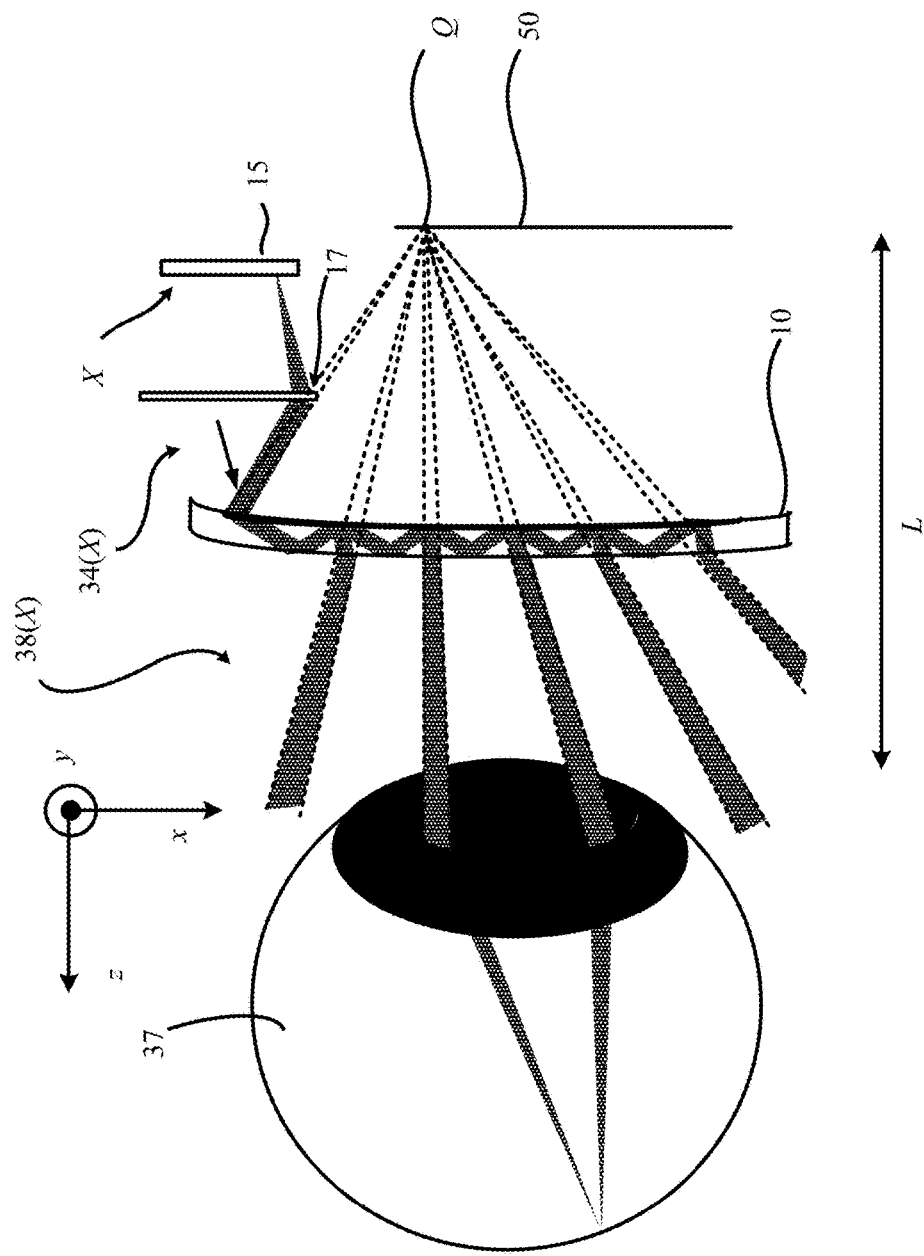
FIG. 7G is a plan view of a curved optical component.

The above considers flat optical components, but a suitably curved optical component (that is, having a radius of curvature extending substantially along the z direction) can be configured to function as an effective lens such that the output beams 30(X) are and are no longer as highly collimated and are not parallel, but have specific relative direction and angular separations such that each traces back to a common point of convergence—this is illustrated in FIG. 7G, in which the common point of convergence is labelled Q. Moreover, when every image point is considered, the various points of convergence for all the different active image points lie in substantially the same plane, labelled 50, located a distance L from the eye (37) so that the eye (37) can focus accordingly to perceive the whole image as if it were the distance L away. This can be equivalently stated as the various output beams forming substantially the same virtual version of the current display image as the corresponding input beams, but at the distance L from the eye (37) rather than at infinity. Curved optical components may be particularly suitable for short-sighted eyes unable to properly focus distant images.

Note, in general the "width" of the fold and exit zones does not have to be their horizontal extent—in general, the width of a fold or exit zone (14, 16) is that zone's extent in the general direction in which light is coupled into the fold zone 14 from the incoupling zone 12 (which is horizontal in the above examples, but more generally is a direction substantially perpendicular to the grating lines of the incoupling zone 12).

Returning to FIG. 2B, left and right input beams are guided though left and right waveguides (10L, 10R) onto the left and right eye respectively. Note that, for a transmissive arrangement in which the beams are coupled into and exit the optical component on opposite sides, is does not matter if the waveguides (10L, 10R) move relative to the left and right imaging components (15L/17L, 15R, 17R) as this does not change the orientation of the output beams i.e. even if the optical components rotate or move, the angular relationship between the input and output beams is unchanged (in this example, they remain parallel). It is only relative movement between the left components (15L/17L) and the right components (15R/17R) that introduces binocular disparity. Thus all that is needed to maintain binocular parity of the left and right images is to ensure that angular alignment of the left and right imaging components (15L/17L, 15R/17R) is preserved, which is achieved by housing them at the same central location and further aided by the rigid support structure.

This is true whenever for any type of incoupling optics and outcoupling optics (be they gratings or other structures) which are on opposite sides of the waveguide as this causes the waveguide to act like a periscope where the angle of a light ray entering the waveguide is equal to the angle of the light ray exiting the waveguide. Further details of this effect are described in the Applicant's International Patent Application PCT/US2014/016658, filed 17 Feb. 2014, which relates to coupling light into waveguides in a near-eye display device in a manner configured to be tolerant to misalignment of the waveguides with each other and/or other optics. For example, one arrangement disclosed therein provides a near-eye display device comprising one or more waveguides, wherein each waveguide comprises a light input coupling configured to receive light at a first side of the waveguide to couple the light into the waveguide, and a light output coupling configured to emit light from the waveguide at a second side of the waveguide, the second side of the waveguide being opposite the first side of the waveguide.

The support structure in the central portion (4) is sufficiently rigid to ensure that, during normal use of the system (1), beams OBL output from the left exit grating 16L of the left optical component 10L onto the user's left eye remain aligned with beams OBR output from the right exit grating 16R of the right optical component 10R onto the user's right eye to within ½ milliradian of their intended alignment (i.e. that for which the correct stereoscopic image is perceived), at least as measured relative to the vertical direction. Note that alignment to within 1 milliradian is acceptable in practice. As will be apparent in view of the foregoing, maintaining this level of angular alignment ensures alignment of the left and right images to within one pixel at least in the vertical direction. Vertical disparity is generally being more perceptible to the HVS than horizontal disparity as discussed, but horizontal alignment may nonetheless be preserved to the same precision by some support structures. As will be apparent, a variety of sufficiently stiff, lightweight materials can be used to make the support structure.

Figure 10:
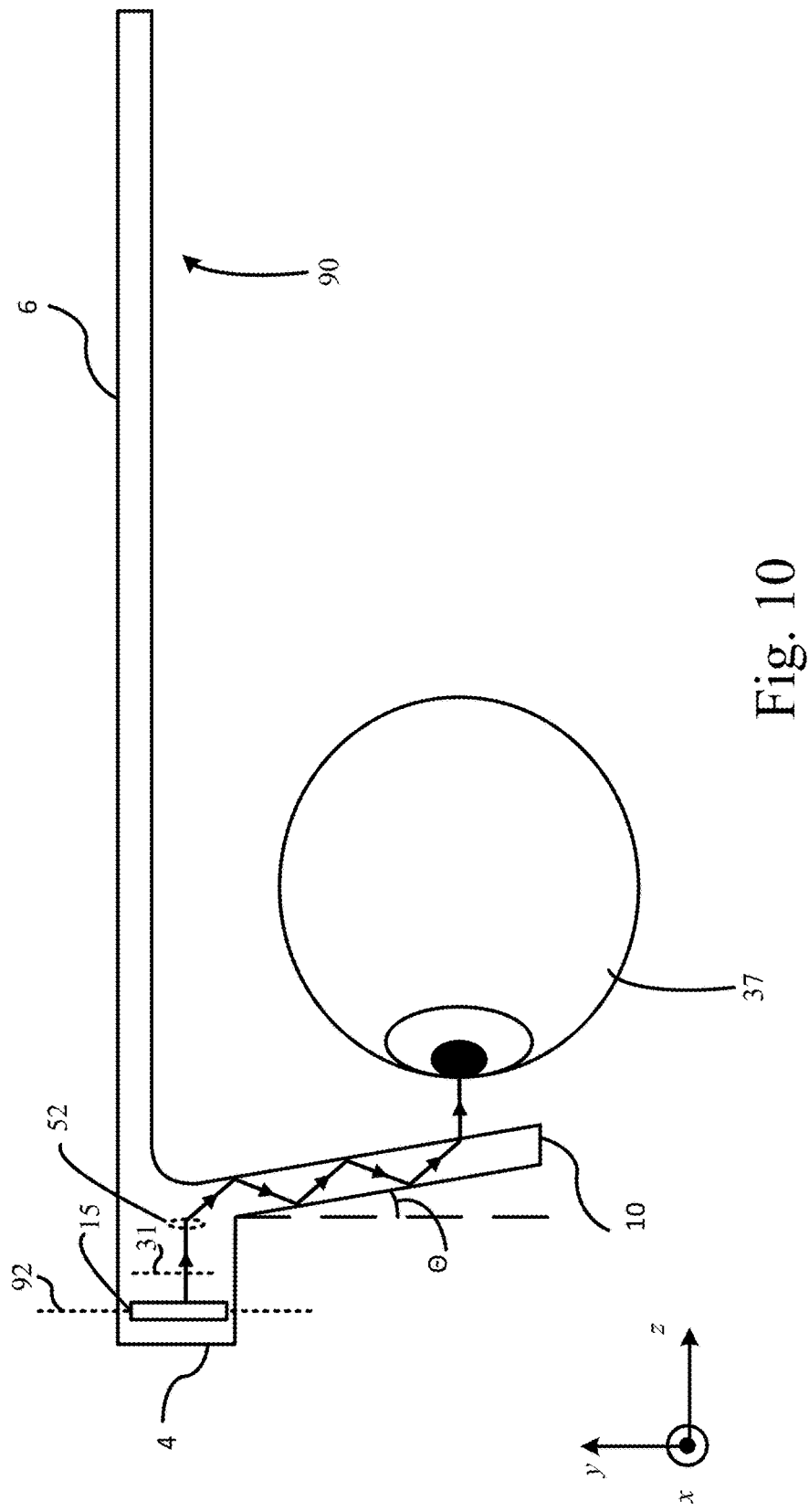
FIG. 10 shows a side view of a display system.

FIG. 10 shows another feature of the head mounted display. FIG. 10 is a view looking from the side of the head mounted display shown in FIG. 1. It shows one of the support extensions 6 and the mounting portion 4. The wearer's ears are not shown in FIG. 10, but it will be understood that a part (90) of the support extension (6) fits over an ear of the user and extends horizontally therefrom towards the front of the user's face. The display (4) lies in a plane (92), which is shown to be vertical and substantially perpendicular to the support extension (6) in the figures. However, in general the display can be arranged in any orientation (e.g. the display panel can be even in horizontal position) depending on how the folding optics of the light engine is implemented.

FIG. 10 also shows the optical component (10) and in particular shows that the optical component (10) is not arranged vertically with respect to the supporting extension (6). Instead, the optical component (10) extends at an angle towards the user's eye. In FIG. 7, the vertical is shown by a dotted line and the angle is shown as an acute angle Θ.

Figure 11:
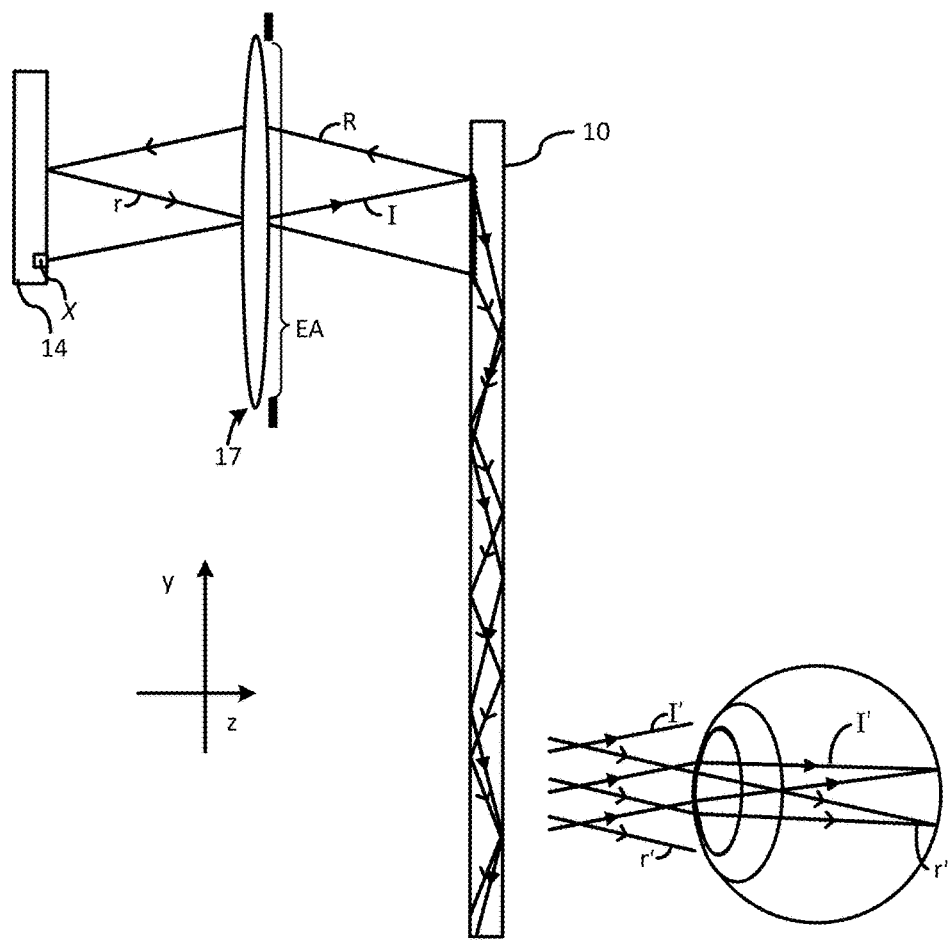
FIG. 11 shows how ghost images may be created in certain display systems.
Figure 12:
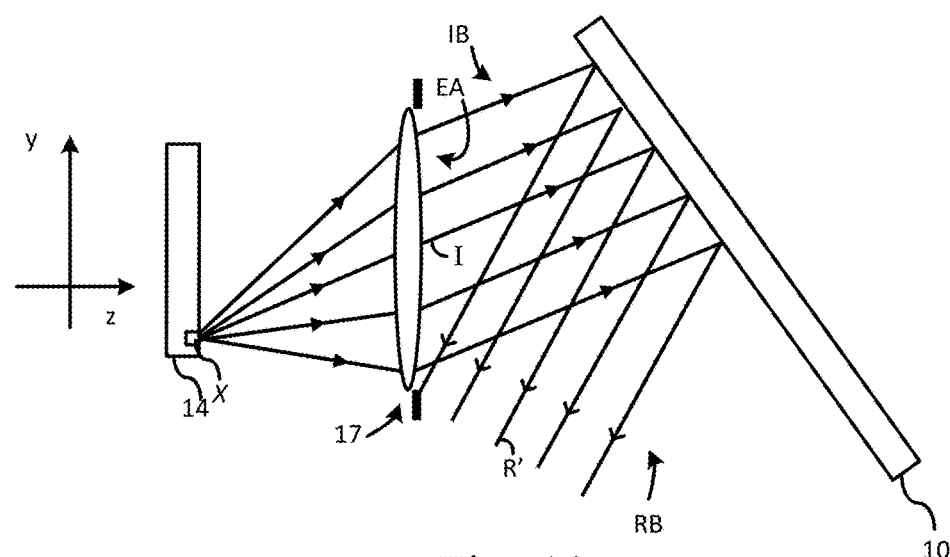
FIG. 12 illustrates a mechanism by which ghost images can be eliminated.

The reason for this is shown in FIGS. 11 and 12. As shown in FIGS. 11 and 12, the light engine 13 has an exit aperture EA. The exit aperture may for instance be formed in a housing of the light engine, or a partition which separates the internal optics of the light engine from the waveguide. Light can only enter or exit the light engine 13 via the exit aperture EA. FIG. 11 shows how the light may behave when the optical component is arranged truly vertically. Consider the incident ray labelled (I) which comes from a pixel (X) of the micro display (14) and is incident on the incoupling grating (12). For this incident ray (I), the angle of incidence is such that there is a reflected ray (R) which is reflected back through the imaging optics (17) and is incident on the display (14). As the display (14) has some reflectivity at its surface, a ghost reflection (r) is reflected off the micro display and formed by the imaging optics (17) onto the in-coupling grating (12) of the optical component. Thus, in addition to the desired ray (I) which is guided through total internal reflection through the optical component and diffracted out to the user's eye (as output rays I'), there is a ghost image formed by the reflective beam (R/r) which is also guided through total internal reflection and ends up incident on the user's eye (as output rays r'). Although the light level of the ghost image might be small, nevertheless, it is an irritant to the user and destroys his clarity of vision of the intended image.

FIG. 12 shows how this ghost image can be removed by angling the optical component (10) in the yz-plane at an angle Θ relative to the plane (92), with the bottom of the optical component (10) angled towards the user (i.e. so that the bottom of the optical component 10 is nearer the user than the top of the optical component 10). In this case, the incident ray I is similarly reflected from the in-coupling grating (12), but the reflective beam R' in this case is reflected at an angle which does not hit the lens of the optics (17). The angle Θ is sufficiently large that this is the case for all rays from X (which are collimated to form an incident beam IB) so that the version RB of the incident beam IB that is outwardly reflected by the optical component (10) propagates entirely clear of the optics (17). Thus, no ghost image of the pixel X is formed.

To ensure that no ghost images of any pixels are formed, this should hold true for all pixels on the display (recall, each pixel results in a single respective beam), thus the angle Θ is dependent on the arrangement of the display 15, optics 17 and optical component 10 relative to one another. When the optical component is tilted vertically towards the user as in FIG. 12, it is sufficient for the angle Θ to be large enough that the beams from the lower-most row of pixels are reflected clear of the collimating optics as these reflected beams will come to the optics (17) than any other beams because they have the smallest angles of incidence in the yz-plane.

Note that the above arrangement of the light engine 13 is just an example. For example, an alternative light engine based on so-called scanning can provide a single beam, the orientation of which is fast modulated whilst simultaneously modulating its intensity and/or colour. As will be apparent, a virtual image can be simulated in this manner that is equivalent to a virtual image that would be created by collimating light of a (real) image on a display with collimating optics.

The relevant factor with regards to preventing ghosting is the angle at which the collimated beams from the light engine meet the light guide plate, which is true whatever the configuration of the light engine. Ghosting will be eliminated provided beam back-reflected versions of the beam cannot re-enter the light engine. Thus, ghosting is eliminated whenever the angle between the light engine and the optical component is such that there will be no reflections from the plate back to the light engine exit aperture at any angular values of the field of view of the light engine.

Whilst in the above the optical components are tilted vertically towards the user, ghosting can be eliminated by angling each optical component, relative to the plane 92 in which the display 90 of the light engine lines, in the any direction, provided each optical component is tilted relative to the light engine by an angle large enough that all reflected beams clear the exit aperture.

The optical component (10) can be mounted at the angle Θ using any suitable mounting mechanism; in particular it could be fixed into portion of the frame which already tilted at this angle to provide support for the optical component at this angle.

Note that the elimination of ghosting by tilting can be used in other types of display system, for example one in which beams from the same display are coupled into left and right optical waveguide components so that an image is perceived by both eyes from a single display, or in which a single waveguide is used to provide an image from a single display to one eye only.

Whilst the above covers Surface Relief Gratings, the subject matter is applicable to other structures for example other diffractive based waveguide displays, and reflective (non-diffractive) waveguide displays.

According to a first aspect, a wearable image display system comprises a headpiece, a first and a second light engine, and a first and a second optical component. The first and second light engines are configured to generate a first and a second set of beams respectively. Each beam is substantially collimated so that the first and second set form a first and a second virtual image respectively. The light engines are mounted on the headpiece. Each optical component is located to project an image onto a first and a second eye of a wearer respectively and comprises an incoupling structure and an exit structure. The first and second sets of beams are directed to the incoupling structures of the first and second optical components respectively. The exit structures of the first and second optical components are arranged to guide the first and second sets of beams onto the first and second eyes respectively. The optical components are located between the light engines and the eyes. Both of the light engines are mounted to a central portion of the headpiece.

In embodiments, the system may comprise a support structure mounted to the central portion which supports the first and second light engines, the support structure more rigid than the headpiece.

The support structure may be sufficiently rigid to maintain vertical alignment between the first and second sets of beams to within substantially one milliradian. In addition, horizontal alignment between the first and second sets of beams may also maintained by the support structure to within substantially one milliradian. The support structure ma for example formed of carbon fibre or titanium.

Each optical component may comprise a fold structure which manipulates the spatial distributions of the beams within the waveguide.

The optical components may be substantially transparent whereby a user can see through them to view a real-world scene simultaneously with the projected images.

The first and second sets of beams may be directed from first and second exit apertures of the first and second light engine respectively, and the optical components may be angled relative to the light engines such that any outwardly reflected versions of the beams propagate clear of the exit apertures.

The first and second images may differ from one another so that a stereoscopic image is perceived by the wearer.

The first light engine may comprise a first display on which a first image is generated, and collimating optics arranged to generate the first set of beams from the first image on the first display; the second light engine may comprise a second display on which a second image is generated, and collimating optics arranged to generate the second set of beams from the second image on the second display.

The structures may be gratings, whereby the beams are diffracted onto the eye.

The headpiece may comprise a frame, helmet or headband.

The optical components may for example be formed of glass or polymer.

According to a second aspect, a wearable image display system comprises a headpiece, collimating optics, a first and a second display on which a first and a second image is generated respectively, a first and a second display on which a first and a second image is generated respectively, and a first and a second optical component. The displays are mounted on the headpiece. Each optical component is located to project an image onto a first and a second eye of a wearer respectively and comprises an incoupling structure and an exit structure. The collimating optics is arranged to substantially collimate each image into respective beams and to direct the beams of the first and second images to the incoupling structures of the first and second optical components respectively. The exit structures of the first and second optical components are arranged to diffract versions of the first and second images onto the first and second eyes respectively. The optical components are located between the collimating optics and the eyes. Both of the displays and the collimating optics are mounted to a central portion of the headpiece.

In embodiments, the optical components may be substantially transparent whereby a user can see through them to view a real-world scene simultaneously with the projected images.

The first and second images may differ from one another so that a stereoscopic image is perceived by the wearer.

According to a third aspect, a wearable image display system comprises a frame, collimating optics, a first and a second display on which a first and a second image is generated respectively, and a first and a second optical component. The displays mounted on the frame. Each optical component is located to project an image onto a first and a second eye of a wearer respectively and comprises an incoupling grating and an exit grating. The collimating optics is arranged to substantially collimate each image into respective beams and to direct the beams of the first and second images to the incoupling gratings of the first and second optical components respectively. The exit gratings of the first and second optical components are arranged to diffract versions of the first and second images onto the first and second eyes respectively. The optical components are located between the collimating optics and the eyes. A support structure is mounted to a central portion of the frame and supports the first and second displays and the collimating optics, the support structure more rigid than the frame.

The support structure may be sufficiently rigid to maintain vertical alignment between the diffracted versions of the first and second images to within substantially one milliradian. Horizontal alignment between the diffracted versions of the first and second images may also be maintained by the support structure to within substantially one milliradian.

Each optical component may comprise a fold grating which manipulates the spatial distributions of the beams within the waveguide.

The optical components may be substantially transparent whereby a user can see through them to view a real-world scene simultaneously with the projected images.

The first and second images may differ from one another so that a stereoscopic image is perceived by the wearer.

According to a fourth aspect, a wearable image display system comprises a headpiece, a light engine, and an optical component. The light engine is mounted on the headpiece and configured to generate beams, each of the beams being substantially collimated so that the beams form a virtual image. The optical component is located to project an image onto an eye of a wearer and comprises an incoupling structure and an exit structure. The beams are directed from an exit aperture of the light engine to the in-coupling structure of the optical component. The exit structure is arranged to guide the beams onto the eye. The optical component is located between light engine and the eye. The optical component is angled relative to the light engine such that any outwardly reflected versions of the beams propagate clear of the exit aperture.

In embodiments, the light engine may comprise a display on which an image is generated, and collimating optics arranged to generate the beams from the image on the display.

The structures may be gratings, whereby the beams are diffracted onto the eye.

The optical component may be angled towards the wearer.

The optical component may comprise a fold structure which manipulates the spatial distributions of the beams within the waveguide.

The optical component may be substantially transparent whereby a user can see through it to view a real-world scene simultaneously with the projected image.

The optical component may comprise two such light engines, each configured to generate a respective such virtual image, and two such optical components wherein the virtual images differ from one another so that a stereoscopic image is perceived by the wearer.

The optical components may for example be formed of glass or polymer.

The light engine may be mounted to a central portion of the frame.

The headpiece may comprise a frame, helmet or headband.

According to a fifth aspect, a wearable image display system comprises a headpiece, a display on which an image is generated, an optical component, and collimating optics. The display is mounted on the headpiece and lies in a plane. The optical component is located to project an image onto an eye of a wearer and comprises an incoupling structure and an exit structure. The collimating optics is arranged to substantially collimate the image into beams and to direct the beams to the in-coupling structure of the optical component. The exit structure is arranged to guide the beams onto the eye. The optical component is angled relative to said plane by an amount such that that any outwardly reflected versions of the beams propagate clear of the collimating optics.

The structures may be gratings, whereby the beams are diffracted onto the eye.

The optical component may be angled towards the wearer.

The optical component may comprise a fold structure which manipulates the spatial distributions of the beams within the waveguide.

The optical component may be substantially transparent whereby a user can see through it to view a real-world scene simultaneously with the projected image.

The optical component may for example be formed of glass or polymer.

According to a sixth aspect, a wearable image display system comprises a headpiece; a first and a second display on which a first and a second image is generated respectively, a first and a second optical component, and collimating optics. The displays are mounted on the headpiece and lie in a plane. Each optical component is located to project an image onto a first and a second eye of a wearer respectively and comprises an incoupling grating and an exit grating. The collimating optics is arranged to substantially collimate each image into respective beams and to direct the beams of the first and second images to the incoupling gratings of the first and second optical components respectively. The exit gratings of the first and second optical components is arranged to diffract versions of the first and second images onto the first and second eyes respectively. The optical components is located between the collimating optics and the eyes. Each optical component is angled relative to said plane by an amount such that any outwardly reflected versions of the beams propagate clear of the collimating optics.

The first and second images may differ from one another so that a stereoscopic image is perceived by the wearer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A wearable image display system comprising:
   a headpiece;
   a first and a second light engine configured to generate a first and a second set of beams respectively, each beam substantially collimated so that the first and second set form a first and a second virtual image respectively, the light engines mounted on the headpiece; and a first and a second optical component, each optical component located to project an image onto a first and a second eye of a wearer respectively and comprising a respective incoupling structure and a respective exit structure;

wherein the first and second sets of beams are directed to the respective incoupling structure of the first and second optical components respectively, the respective exit structure of the first and second optical components being arranged to guide the first and second sets of beams onto the first and second eyes respectively, wherein the optical components are located between the light engines and the eyes, and wherein both of the light engines are mounted to a central portion of the headpiece.

2. A system according to claim 1 comprising a support structure mounted to the central portion which supports the first and second light engines, the support structure more rigid than the headpiece.

3. A system according to claim 2 wherein the support structure is sufficiently rigid to maintain vertical alignment between the first and second sets of beams to within substantially one milliradian.

4. A system according to claim 3, wherein horizontal alignment between the first and second sets of beams is also maintained by the support structure to within substantially one milliradian.

5. A system according to claim 2 wherein the support structure is formed of carbon fibre or titanium.

6. A system according to claim 1 wherein each optical component comprises a fold structure which manipulates a spatial distribution of the beams within said each optical component.

7. A system according to claim 1 wherein the first and second sets of beams are directed from first and second exit apertures of the first and second light engine respectively, and the optical components are angled relative to the light engines such that any outwardly reflected versions of the beams propagate clear of the exit apertures.

8. An optical component according to claim 1 wherein the image projected onto the first eye and the image projected onto the second eye differ from one another so that a stereoscopic image is perceived by the wearer.

9. A system according to claim 1 wherein the first light engine comprises a first display on which a first image is generated, and collimating optics arranged to generate the first set of beams from the first image on the first display; and
wherein the second light engine comprises a second display on which a second image is generated, and collimating optics arranged to generate the second set of beams from the second image on the second display.

10. A system according to claim 1 wherein the structures are gratings, whereby the beams are diffracted onto the eye.

11. A system according to claim 1 wherein the headpiece comprises a frame, helmet or headband.

12. A system according to claim 1 wherein the optical components are formed of glass.

13. A system according to claim 1 wherein the optical components are formed of polymer.

14. A wearable image display system comprising:
a headpiece;
a first and a second display on which a first and a second image is generated respectively, the displays mounted on the headpiece;
a first and a second optical component, each optical component located to project an image onto a first and a second eye of a wearer respectively and comprising a respective incoupling structure and a respective exit structure; and
collimating optics arranged to substantially collimate each image into respective beams and to direct the beams of the first and second images to the respective incoupling structure of the first and second optical components respectively, the respective exit structure of the first and second optical components being arranged to diffract versions of the first and second images onto the first and second eyes respectively, wherein the optical components are located between the collimating optics and the eyes, wherein both of the displays and the collimating optics are mounted to a central portion of the headpiece.

15. An optical component according to claim 14 wherein the first and second images differ from one another so that a stereoscopic image is perceived by the wearer.

16. A system according to claim 14 wherein the support structure is sufficiently rigid to maintain vertical alignment between the diffracted versions of the first and second images to within substantially one milliradian.

17. A system according to claim 14, wherein horizontal alignment between the diffracted versions of the first and second images is also maintained by the support structure to within substantially one milliradian.

18. A wearable image display system comprising:
a frame;
a first and a second display on which a first and a second image is generated respectively, the displays mounted on the frame;
a first and a second optical component, each optical component located to project an image onto a first and a second eye of a wearer respectively and comprising a respective incoupling grating and a respective exit grating;
collimating optics arranged to substantially collimate each image into respective beams and to direct the beams of the first and second images to the respective incoupling grating of the first and second optical components respectively, the respective exit grating of the first and second optical components being arranged to diffract versions of the first and second images onto the first and second eyes respectively, wherein the optical components are located between the collimating optics and the eyes; and
a support structure mounted to a central portion of the frame and which supports the first and second displays and the collimating optics, the support structure more rigid than the frame.

* * * * *